United States Patent
Ji et al.

(10) Patent No.: US 11,979,225 B2
(45) Date of Patent: May 7, 2024

(54) DOWNLINK CONTROL INFORMATION TRANSMISSION METHOD, APPARATUS, AND SYSTEM

(71) Applicant: HUAWEI TECHNOLOGIES CO., LTD., Shenzhen (CN)

(72) Inventors: Liuliu Ji, Shanghai (CN); Hongzhe Shi, Shenzhen (CN); Haicun Hang, Shanghai (CN); Min Zhang, Shenzhen (CN); Xiaohan Wang, Shanghai (CN); Xiaoyan Bi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 375 days.

(21) Appl. No.: 17/487,397

(22) Filed: Sep. 28, 2021

(65) Prior Publication Data

US 2022/0014299 A1    Jan. 13, 2022

Related U.S. Application Data

(63) Continuation of application No. PCT/CN2020/081661, filed on Mar. 27, 2020.

(30) Foreign Application Priority Data

Mar. 29, 2019    (CN) .......................... 201910252622.6

(51) Int. Cl.
*H04W 40/06*    (2009.01)
*H04J 13/00*    (2011.01)
(Continued)

(52) U.S. Cl.
CPC .......... *H04J 13/004* (2013.01); *H04L 5/0051* (2013.01); *H04W 72/0446* (2013.01); *H04W 72/23* (2023.01)

(58) Field of Classification Search
None
See application file for complete search history.

(56) References Cited

U.S. PATENT DOCUMENTS

| 9,380,442 B2 | 6/2016 | Turtinen et al. |
| 2013/0343340 A1 | 12/2013 | Seo et al. |

(Continued)

FOREIGN PATENT DOCUMENTS

| CN | 108809609 A | 11/2018 |
| CN | 109391418 A | 2/2019 |

(Continued)

OTHER PUBLICATIONS

Jean-Baptiste Yamindi et al., The approach of the New Downlink Control Information Design for Transmission Mode 10. 2013 Wireless Telecommunications Symposium (WTS), Jul. 25, 2013, 7 pages.

(Continued)

*Primary Examiner* — Phuoc H Nguyen
(74) *Attorney, Agent, or Firm* — Rimon PC

(57) ABSTRACT

Embodiments of this application provide a downlink control information transmission method in which after receiving one piece of downlink control information (DCI), the terminal device learns whether blind detection of DCI needs to be continued. The method includes: A terminal device receives first DCI, where the first DCI includes first indication information, and the first indication information is used to indicate a first antenna port. The terminal device determines, based on the first antenna port and antenna port configuration information, whether second DCI exists. The configuration information may include an index of a CDM group to which each of a plurality of antenna ports belongs and a maximum quantity of CDM groups that is supported by the terminal device. Alternatively the configuration information may include one or more antenna port groups, and each of the one or more antenna port groups includes one or more antenna ports.

13 Claims, 8 Drawing Sheets

(51) Int. Cl.
  *H04L 5/00* (2006.01)
  *H04W 72/0446* (2023.01)
  *H04W 72/23* (2023.01)

(56) References Cited

U.S. PATENT DOCUMENTS

| | | | | |
|---|---|---|---|---|
| 2016/0353317 | A1* | 12/2016 | Kim | .................... H04J 11/0056 |
| 2017/0013609 | A1* | 1/2017 | Kim | .................... H04L 5/0053 |
| 2018/0227886 | A1 | 8/2018 | Chou et al. | |
| 2018/0278395 | A1 | 9/2018 | Yoon | |
| 2020/0099433 | A1* | 3/2020 | Cho | .................... H04B 7/0413 |
| 2020/0127797 | A1* | 4/2020 | Yoon | .................... H04L 5/0053 |
| 2020/0304232 | A1* | 9/2020 | Park | .................... H04L 5/0096 |

FOREIGN PATENT DOCUMENTS

| | | |
|---|---|---|
| WO | 2018031291 A1 | 2/2018 |
| WO | 2018064361 A1 | 4/2018 |
| WO | 2018177178 A1 | 10/2018 |

OTHER PUBLICATIONS

Samsung, CSI-RS RE mapping with CDM-4 for class A CSI reporting. 3GPP TSG RAN WG1 Meeting #83, Anaheim, CA, USA, Nov. 16-20, 2015, R1-156783, 7 pages.

3GPP TS 38.211 V15.5.0 (Mar. 2019), 3rd Generation Partnership Project; Technical Specification Group Radio Access Network; NR; Physical channels and modulation(Release 15), 96 pages.

Alexander Vasylchenko et al., Conformal phased array for a miniature wireless sensor node. 2010 Conference Proceedings ICECom, 20th International Conference on Applied Electromagnetics and Communications, Mar. 10, 2011, 4 pages.

3GPP TS 38.214 V15.5.0 (Mar. 2019), 3rd Generation Partnership Project; Technical Specification Group Radio Access Network; NR; Physical layer procedures for data(Release 15), 103 pages.

3GPP TS 38.212 V15.5.0 (Mar. 2019), 3rd Generation Partnership Project; Technical Specification Group Radio Access Network; NR; Multiplexing and channel coding(Release 15), 101 pages.

3GPP TS 38.213 V15.5.0 (Mar. 2019), 3rd Generation Partnership Project; Technical Specification Group Radio Access Network; NR; Physical layer procedures for control(Release 15), 104 pages.

Huawei, HiSilicon, Enhancements on Multi-TRP/panel transmission. 3GPP TSG RAN WG1 Meeting #96, Athens, Greece, Feb. 25 Mar. 1, 2019, R1-1901567, 14 pages.

Intel Corporation, On multi-stage physical DL control. 3GPP TSG RAN1 WG Meeting #88, Athens, Greece, Feb. 13-18, 2017, R1-1702224, 2 pages.

Huawei, HiSilicon, Enhancements on multi-TRP/panel transmission. 3GPPTSG RAN WGI Ad-Hoc Meeting 1901, Taipei, Jan. 21-25, 2019, R1-1900017, 15 pages.

* cited by examiner

DOWNLINK CONTROL INFORMATION TRANSMISSION METHOD, APPARATUS, AND SYSTEM

CROSS-REFERENCE TO RELATED APPLICATIONS

This application is a continuation of International Application No. PCT/CN2020/081661, filed on Mar. 27, 2020, which claims priority to Chinese Patent Application No. 201910252622.6, filed on Mar. 29, 2019. The disclosures of the aforementioned applications are hereby incorporated by reference in their entireties.

TECHNICAL FIELD

This application relates to the field of communications technologies, and in particular, to a downlink control information (DCI) transmission method, an apparatus, and a system.

BACKGROUND

In the conventional technology, a plurality of transmission reception points (TRP) simultaneously send a plurality of data flows to a terminal device. The plurality of data flows are carried on a plurality of antenna ports for transmission. Orthogonality is ensured between different antenna ports through time division, frequency division, code division, or in another form, to ensure accuracy of performing channel estimation on the antenna ports by the terminal device by using a reference signal in the data flows received from the antenna ports.

Currently, one piece of DCI may be used to schedule the data flows sent by the plurality of TRPs. This solution requires that a fast transmission channel be established between the plurality of TRPs to meet real-time interaction between the plurality of TRPs. This clearly imposes relatively high requirements on network deployment. Based on this, an idea that the data flows sent by the plurality of TRPs may be scheduled by using a plurality of pieces of DCI is proposed.

However, if the data flows sent by the plurality of TRPs may be scheduled by using a plurality of pieces of DCI, currently, there is no related solution to how the terminal device learns, after receiving one piece of DCI, whether blind detection of DCI within the same received signal needs to be continued.

SUMMARY

Embodiments of this application provide a DCI transmission method, an apparatus, and a system, so that after receiving one piece of DCI, the terminal device learns whether blind detection of DCI needs to be continued.

To achieve the foregoing objective, the following technical solutions are used in the embodiments of this application.

According to a first aspect, a downlink control information DCI transmission method is provided. The method includes: A terminal device receives first DCI, where the first DCI includes first indication information, and the first indication information is used to indicate a first antenna port. The terminal device assumes, based on the first antenna port and antenna port configuration information, whether second DCI exists. Based on this solution, after receiving the first DCI indicating the first antenna port, the terminal device may assume, based on the first antenna port and the antenna port configuration information, whether the second DCI exists.

In this application, assuming whether the second DCI exists may also be described as determining or assuming whether the second DCI exists. A general description is provided herein, and details are not described below again.

In a possible design, a second antenna port indicated by the second DCI and the first antenna port belong to different code division multiplexing CDM groups or belong to different antenna port groups. In this way, a problem that antenna ports indicated by a plurality of pieces of DCI may occupy a same CDM group can be avoided, so that interference caused by reference signals sent through these antenna ports is avoided, damage to orthogonality existing when the reference signals are distinguished by using orthogonal codes is avoided, and demodulation performance is not reduced.

In a possible design, the configuration information includes an index of a CDM group to which each of a plurality of antenna ports belongs and a maximum quantity of CDM groups that is supported by the terminal device. That is, in this embodiment of this application, whether the second DCI exists may be assumed based on the first antenna port, the index of the CDM group to which each of the plurality of antenna ports belongs, and the maximum quantity of CDM groups that is supported by the terminal device.

In this application, the CDM group to which the antenna port belongs indicates a CDM group occupied by the antenna port. That one CDM group includes several antenna ports is referred to as that the several antenna ports belong to the CDM group.

In a possible design, that the terminal device assumes, based on the first antenna port and the configuration information, whether the second DCI exists includes: The terminal device determines, based on an index of the first antenna port and the index of the CDM group to which each antenna port belongs, information about a CDM group to which the first antenna port belongs; and the terminal device assumes, based on the information about the CDM group to which the first antenna port belongs and the maximum quantity of CDM groups that is supported by the terminal device, whether the second DCI exists. That is, in this solution, whether the second DCI exists may be assumed based on the information about the CDM group to which the first antenna port belongs and the maximum quantity of CDM groups that is supported by the terminal device.

In a possible design, the information about the CDM group to which the first antenna port belongs includes a quantity of CDM groups to which the first antenna port belongs.

In a possible design, that the terminal device assumes, based on the information about the CDM group and the maximum quantity of CDM groups that is supported by the terminal device, whether the second DCI exists includes: If the quantity of CDM groups is less than the maximum quantity of CDM groups, the terminal device assumes that the second DCI exists; or if the quantity of CDM groups is equal to the maximum quantity of CDM groups, the terminal device assumes that the second DCI does not exist.

In a possible design, the information about the CDM group to which the first antenna port belongs includes an index of the CDM group to which the first antenna port belongs.

In a possible design, that the terminal device assumes, based on the information about the CDM group and the maximum quantity of CDM groups that is supported by the terminal device, whether the second DCI exists includes: If the index of the CDM group to which the first antenna port belongs is the same as an index of a CDM group corresponding to the maximum quantity of CDM groups, the terminal device assumes that the second DCI does not exist; or if the index of the CDM group to which the first antenna port belongs is not completely the same as an index of a CDM group corresponding to the maximum quantity of CDM groups, the terminal device assumes that the second DCI exists. That is, in this embodiment of this application, the terminal device may compare the index of the CDM group to which the first antenna port belongs with the index of the CDM group corresponding to the maximum quantity of CDM groups, to assume whether the second DCI exists.

In a possible design, that the terminal device assumes, based on the information about the CDM group and the maximum quantity of CDM groups, whether the second DCI exists includes: If the index of the CDM group to which the first antenna port belongs is the same as an index of a CDM group corresponding to the maximum quantity of CDM groups, the terminal device assumes that the second DCI does not exist; or if the index of the CDM group to which the first antenna port belongs is not completely the same as an index of a CDM group corresponding to the maximum quantity of CDM groups, and the index of the CDM group to which the first antenna port belongs satisfies a specified rule, the terminal device assumes that the second DCI exists; or if the index of the CDM group to which the first antenna port belongs is not completely the same as an index of a CDM group corresponding to the maximum quantity of CDM groups, and the index of the CDM group to which the first antenna port belongs does not satisfy a specified rule, the terminal device assumes that the second DCI exists. That is, in this embodiment of this application, the terminal device needs to compare the index of the CDM group to which the first antenna port belongs with the index of the CDM group corresponding to the maximum quantity of CDM groups, and compare the index of the CDM group to which the first antenna port belongs with the specified rule, to assume whether the second DCI exists.

In a possible design, the configuration information includes one or more antenna port groups, and each antenna port group includes one or more antenna ports.

In a possible design, that the terminal device assumes, based on the index of the first antenna port and the configuration information, whether the second DCI exists includes: If the index of the first antenna port belongs to a part of the antenna port groups, the terminal device assumes that the second DCI exists; or if the index of the first antenna port belongs to all of the antenna port groups, the terminal device assumes that the second DCI does not exist. That is, in this embodiment of this application, the terminal device may compare the index of the first antenna port with the one or more antenna port groups, to assume whether the second DCI exists.

In a possible design, that the terminal device assumes, based on the first antenna port and the configuration information, whether the second DCI exists includes: If an index of the first antenna port belongs to a part of the antenna port groups, and the index of the first antenna port satisfies a specified rule, the terminal device assumes that the second DCI exists; or if an index of the first antenna port belongs to a part of the antenna port groups, and the index of the first antenna port does not satisfy a specified rule, the terminal device assumes that the second DCI does not exist; or if an index of the first antenna port belongs to all of the antenna port groups, the terminal device assumes that the second DCI does not exist. That is, in this embodiment of this application, the terminal device needs to compare the index of the first antenna port with the one or more antenna port groups, and compares the index of the first antenna port with the specified rule, to assume whether the second DCI exists.

In a possible design, a first transmission reception point TRP corresponding to the first antenna port is different from a second TRP corresponding to the second antenna port indicated by the second DCI.

In a possible design, the method further includes: If it is assumed that the second DCI exists, the terminal device receives the second DCI.

In a possible design, that the terminal device receives the second DCI includes: The terminal device stops current search on a candidate corresponding to at least one physical downlink control channel configuration, control resource set, control resource set group, search space set, or search space set group associated with a first physical downlink control channel; and the terminal device receives the second DCI on a candidate corresponding to at least one physical downlink control channel configuration, control resource set, control resource set group, search space set, or search space set group associated with a second physical downlink control channel. Based on this solution, receiving processing of the second DCI can be implemented.

According to a second aspect, a downlink control information DCI transmission method is provided. The method includes: A network device determines a first antenna port and a second antenna port, where the first antenna port is an antenna port indicated by first downlink control information DCI, the second antenna port is an antenna port indicated by second DCI, and the first antenna port and the second antenna port belong to different code division multiplexing CDM groups or belong to different antenna port groups. The network device sends the first DCI to a terminal device, where the first DCI includes indication information, and the indication information is used to indicate the first antenna port. Based on this solution, a problem that antenna ports indicated by a plurality of pieces of DCI may occupy a same CDM group can be avoided, so that interference caused by reference signals sent through these antenna ports is avoided, damage to orthogonality existing when the reference signals are distinguished by using orthogonal codes is avoided, and demodulation performance is not reduced.

According to a third aspect, a downlink control information DCI transmission method is provided. The method includes: A second network device receives first indication information from a first network device, where the first indication information is used to indicate a code division multiplexing CDM group or an antenna port group to which a first antenna port belongs, and the first antenna port is an antenna port indicated by the first DCI. The second network device determines, based on the first indication information, whether sending of second DCI is supported. If the second network device supports sending of the second DCI, the second network device determines a second antenna port based on the first indication information, where the second antenna port is an antenna port indicated by the second DCI, and the first antenna port and the second antenna port belong to different CDM groups or belong to different antenna port groups. The second network device sends the second DCI to a terminal device, where the second DCI includes second indication information, and the second indication information is used to indicate the second antenna port. Based on this solution, through negotiation between the network devices, a problem that antenna ports indicated by a plurality of pieces of DCI may occupy a same CDM group can be avoided, so that interference caused by reference signals sent through these antenna ports is avoided, damage to orthogonality existing when the reference signals are distinguished by using orthogonal codes is avoided, and demodulation performance is not reduced.

According to a fourth aspect, a downlink control information DCI transmission method is provided. The method includes:

A first network device sends first DCI to a terminal device, where the first DCI includes first indication information, and the first indication information is used to indicate a first antenna port. The first network device sends second indication information to a second network device, where the second indication information is used to indicate a code division multiplexing CDM group or an antenna port group to which the first antenna port belongs. Based on this solution, through negotiation between the network devices, a problem that antenna ports indicated by a plurality of pieces of DCI may occupy a same CDM group can be avoided, so that interference caused by reference signals sent through these antenna ports is avoided, damage to orthogonality existing when the reference signals are distinguished by using orthogonal codes is avoided, and demodulation performance is not reduced.

According to a fifth aspect, a communication method is provided. The method includes: A terminal device receives first downlink control information DCI from a first network device. The terminal device determines, based on related information of the first DCI and a preset rule, a first antenna port corresponding to data scheduled by the first DCI. The terminal device receives second DCI from a second network device. The terminal device determines, based on related information of the second DCI and the preset rule, a second antenna port corresponding to data scheduled by the second DCI, where the first antenna port and the second antenna port belong to different code division multiplexing CDM groups or belong to different antenna port groups. Based on this solution, when DCI in a DCI format 1_0 is used for scheduling, a problem of how to ensure that antenna ports corresponding to data scheduled by a plurality of pieces of DCI belong to different CDM groups can be resolved, thereby improving network performance.

According to a sixth aspect, a communication method is provided. The method includes: A network device determines a first antenna port and a second antenna port, where the first antenna port is an antenna port corresponding to data scheduled by first downlink control information DCI, the second antenna port is an antenna port corresponding to data scheduled by second DCI, and the first antenna port and the second antenna port belong to different CDM groups or belong to different antenna port groups. The network device determines, based on a preset rule, related information of the first DCI corresponding to the first antenna port and related information of the second DCI corresponding to the second antenna port. The network device sends the first DCI to a terminal device based on the related information of the first DCI, and the network device sends the second DCI to the terminal device based on the related information of the second DCI. Based on this solution, when DCI in a DCI format 1_0 is used for scheduling, a problem of how to ensure that antenna ports corresponding to data scheduled by a plurality of pieces of DCI belong to different CDM groups can be resolved, thereby improving network performance.

According to a seventh aspect, a communication method is provided. The method includes: A second network device receives first indication information from a first network device, where the first indication information is used to indicate a code division multiplexing CDM group or an antenna port group to which a first antenna port belongs, and the first antenna port is an antenna port corresponding to data scheduled by first downlink control information DCI. The second network device determines, based on the first indication information, whether sending of second DCI is supported. If the second network device supports sending of the second DCI, the second network device determines a second antenna port based on the first indication information, where the second antenna port is an antenna port corresponding to data scheduled by the second DCI, and the first antenna port and the second antenna port belong to different CDM groups or belong to different antenna port groups. The second network device determines, based on a preset rule, related information of the second DCI corresponding to the second antenna port. The network device sends the second DCI to a terminal device based on the related information of the second DCI. Based on this solution, when DCI in a DCI format 1_0 is used for scheduling, a problem of how to ensure that antenna ports corresponding to data scheduled by a plurality of pieces of DCI belong to different CDM groups can be resolved, thereby improving network performance.

According to an eighth aspect, a communication method is provided. The method includes: A first network device determines a first antenna port, where the first antenna port is an antenna port corresponding to data scheduled by first downlink control information DCI. The first network device determines, based on a preset rule, related information of the first DCI corresponding to the first antenna port. The network device sends the first DCI to a terminal device based on the related information of the first DCI, and the first network device sends first indication information to a second network device, where the first indication information is used to indicate a code division multiplexing CDM group or an antenna port group to which the first antenna port belongs. Based on this solution, when DCI in a DCI format 1_0 is used for scheduling, a problem of how to ensure that antenna ports corresponding to data scheduled by a plurality of pieces of DCI belong to different CDM groups can be resolved, thereby improving network performance.

With reference to any one of the fifth aspect to the eighth aspect, the preset rule includes a mapping relationship between an antenna port and a cyclic redundancy check CRC mask of DCI; and correspondingly, the related information of the first DCI includes a CRC mask of the first DCI, and the related information of the second DCI includes a CRC mask of the second DCI.

With reference to any one of the fifth aspect to the eighth aspect, the preset rule includes a mapping relationship between an antenna port and a control resource set in which DCI is located; and correspondingly, the related information of the first DCI includes a control resource set in which the first DCI is located, and the related information of the second DCI includes a control resource set in which the second DCI is located.

With reference to any one of the fifth aspect to the eighth aspect, the preset rule includes a mapping relationship between an antenna port and a search space set in which DCI is located; and correspondingly, the related information of the first DCI includes a search space set in which the first DCI is located, or the related information of the second DCI includes a search space set in which the second DCI is located.

According to a ninth aspect, a communications apparatus is provided, to implement the foregoing methods. The communications apparatus may be the terminal device in the first aspect or the fifth aspect, or an apparatus including the terminal device. Alternatively, the communications apparatus may be the network device in the second aspect or the sixth aspect, or an apparatus including the network device. Alternatively, the communications apparatus may be the second network device in the third aspect or the seventh aspect, or an apparatus including the second network device. Alternatively, the communications apparatus may be the first network device in the fourth aspect or the eighth aspect, or an apparatus including the first network device. The communications apparatus includes a corresponding module, unit, or means (means) for implementing the foregoing methods. The module, unit, or means may be implemented by hardware or software, or implemented by hardware executing corresponding software. The hardware or the software includes one or more modules or units corresponding to the functions.

According to a tenth aspect, a communications apparatus is provided. The communications apparatus includes a processor and a memory. The memory is configured to store computer instructions. When the processor executes the instructions, the communications apparatus is enabled to perform the method according to any one of the first aspect to the eighth aspect. The communications apparatus may be the terminal device in the first aspect or the fifth aspect, or an apparatus including the terminal device. Alternatively, the communications apparatus may be the network device in the second aspect or the sixth aspect, or an apparatus including the network device. Alternatively, the communications apparatus may be the second network device in the third aspect or the seventh aspect, or an apparatus including the second network device. Alternatively, the communications apparatus may be the first network device in the fourth aspect or the eighth aspect, or an apparatus including the first network device.

According to an eleventh aspect, a communications apparatus is provided. The communications apparatus includes a processor. The processor is configured to: be coupled to a memory, and after reading instructions from the memory, perform the method according to any one of the first aspect to the eighth aspect based on the instructions. The communications apparatus may be the terminal device in the first aspect or the fifth aspect, or an apparatus including the terminal device. Alternatively, the communications apparatus may be the network device in the second aspect or the sixth aspect, or an apparatus including the network device. Alternatively, the communications apparatus may be the second network device in the third aspect or the seventh aspect, or an apparatus including the second network device. Alternatively, the communications apparatus may be the first network device in the fourth aspect or the eighth aspect, or an apparatus including the first network device.

According to a twelfth aspect, a computer-readable storage medium is provided. The computer-readable storage medium stores instructions; and when the instructions are run on a computer, the computer is enabled to perform the method according to any one of the first aspect to the eighth aspect.

According to a thirteenth aspect, a computer program product including instructions is provided. When the computer program product runs on a computer, the computer is enabled to perform the method according to any one of the first aspect to the eighth aspect.

According to a fourteenth aspect, a communications apparatus (for example, the communications apparatus may be a chip or a chip system) is provided. The communications apparatus includes a processor, configured to implement the functions in any one of the first aspect to the eighth aspect. In a possible design, the communications apparatus further includes a memory. The memory is configured to store necessary program instructions and data. When the communications apparatus is the chip system, the communications apparatus may include a chip, or may include a chip and another discrete component.

For technical effects brought by any design manner of the ninth aspect to the fourteenth aspect, refer to technical effects brought by different design manners of the first aspect to the eighth aspect. Details are not described herein again.

According to a fifteenth aspect, a communications system is provided. The communications system includes the terminal device in the foregoing aspects and the network device in the foregoing aspects. Alternatively, the communications system includes the terminal device in the foregoing aspects, the first network device in the foregoing aspects, and the second network device in the foregoing aspects

DESCRIPTION OF EMBODIMENTS

Figure 1:
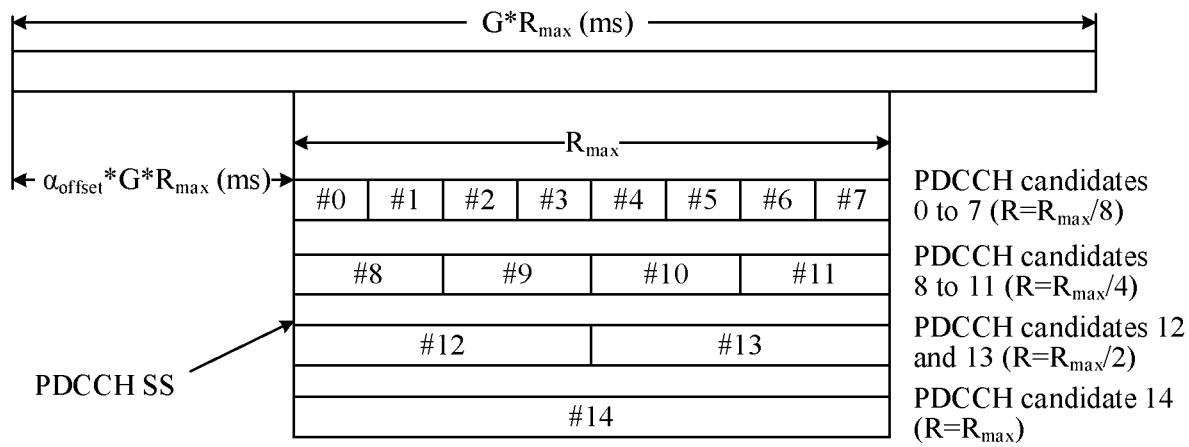
FIG. 1 is a schematic diagram of an existing NPDCCH candidate.

For ease of understanding solutions in the embodiments of this application, brief descriptions or definitions of related technologies are first provided as follows:

1. Antenna Port:

An antenna port defines a channel on a symbol. The antenna port is a logical concept. One antenna port may correspond to one physical transmit antenna, or may correspond to a plurality of physical transmit antennas. A channel through which a signal sent by using an antenna port pass may be estimated by using a reference signal (RS) (which may also be referred to as a pilot). For example, an antenna port corresponding to a demodulation reference signal (DMRS) may be referred to as a DMRS port. A terminal device may perform channel estimation on the antenna port by using the reference signal sent by using the antenna port.

2. Quasi-Colocation:

That two antenna ports have a quasi-colocation (QCL) relationship means that a channel large-scale parameter of one antenna port may be inferred (infer) based on an obtained (conveyed) channel large-scale parameter of the other antenna port. The large-scale parameter may include one or more of an average gain (average gain), an average delay, a delay spread, a Doppler shift, a Doppler spread, or a spatial parameter (spatial parameter or spatial Rx parameters).

3. Time Domain/Time Unit:

A time domain/time unit in the embodiments of this application includes at least a plurality of time sampling points, and may be a frame, a radio frame, a system frame, a subframe, a half frame, a slot, a mini-slot, a symbol, or the like.

4. Frequency Domain Unit:

A frequency domain unit in the embodiments of this application includes at least one subcarrier, and may be a subcarrier, a resource block (resource block, RB), a physical resource block, a virtual resource block, a precoding resource block group (precoding resource block group, PRG), a physical resource block group (physical resource block group, RBG), a subband (subband), a partial bandwidth (partial bandwidth), a bandwidth part (bandwidth part, BWP), a carrier (carrier), a serving cell (serving cell), a frequency band (band), and the like.

5. Time Division, Frequency Division, and Code Division Between RSs:

Time division means that RSs corresponding to different antenna ports occupy different time domain resources (for example, different orthogonal frequency division multiplexing (orthogonal frequency division multiplexing, OFDM) symbols).

Frequency division means that reference signals corresponding to different antenna ports occupy different frequency domain resources (for example, different subcarriers).

Code division means that reference signals corresponding to different antenna ports occupy a same time-frequency resource, and are distinguished by using different code domain resources. An example of code division is that two antenna ports occupy two same resource elements (resource element, RE), and orthogonal codes [1, 1] and [1, −1] are used to distinguish between the two antenna ports on the two resource elements.

6. Control Channel Element (Control Channel Element, CCE) and Aggregation Level:

A basic composition unit of a physical downlink control channel (physical downlink control channel, PDCCH) is a CCE. One PDCCH occupies one or more CCEs. A larger quantity of occupied CCEs indicates higher reliability of the PDCCH and more consumed resources. When one user-specific PDCCH occupies some CCEs, a PDCCH of another user usually does not occupy these CCEs. That is, a limited total quantity of resources can support a limited total quantity of scheduled PDCCHs.

The CCE includes six resource element groups (resource element group, REG), and a resource of one REG includes an RB in frequency domain and one OFDM symbol in time domain. There is a mapping relationship between a CCE and an REG. That is, a plurality of REGs including a plurality of RBs and a plurality of symbols may be mapped to a CCE based on a specified mapping relationship. The mapping may be direct mapping (for example, six contiguous REGs form a CCE) or interleaved mapping (REGs are interleaved and then mapped to the CCE) and the like. This is not specifically limited in the embodiments of this application.

A quantity of CCEs forming a PDCCH is referred to as an aggregation level of the CCEs. For a user, the user may need to detect a plurality of aggregation levels such as 1, 2, 4, 8, and 16. Within a specific resource range, the terminal device detects a PDCCH by using a possible aggregation level. For example, the terminal device attempts to detect, based on a rule by using the aggregation level 4, whether a PDCCH exists in a resource including four CCEs, and whether the PDCCH can be correctly demodulated. The terminal device further tries other aggregation levels. These possible aggregation level candidates may be allocated by a base station to the terminal device.

7. Control Resource Set (Control Resource Set, CORESET):

A CORESET defines a possibility of a frequency domain in which a PDCCH is detected. The base station may configure, for the terminal device, information such as an identifier of the CORESET, a DMRS scrambling identifier (identification, ID) of the PDCCH, a frequency domain precoding granularity, a symbol length, a frequency domain position, a mapping manner between a CCE and a REG, a quasi-colocation assumption for receiving a PDCCH, and whether there is a transmission configuration indication (transmission configuration indication, TCI) field in DCI of the PDCCH received in the CORESET.

In addition, one or more CORESETs may belong to a CORESET group (group). When a CORESET group includes one CORESET, an identifier of the CORESET group may be used as an identifier of the CORESET included in the CORESET group, or an identifier of the CORESET in the CORESET group may be used as an identifier of the CORESET group. This is not specifically limited in the embodiments of this application.

8. Search Space (Search Space, SS):

A search space defines a possibility of a time domain in which a physical downlink control channel (physical downlink control channel, PDCCH) is detected. The network device may configure, for the terminal device, information such as an identifier of a search space, an identifier of a CORESET associated with the search space, a PDCCH detection time unit period, a time unit offset, a time domain detection pattern (pattern), a quantity of possible PDCCH candidates (candidates) for each aggregation level (the quantity may be 0), a search space type, or a configuration related to a DCI format. There may be a plurality of PDCCH candidates in one PDCCH search space period. FIG. 1 is an example schematic diagram of a PDCCH candidate according to an embodiment of this application. The PDCCH search space period is G*Rmax, and duration of a PDCCH search space within G*Rmax is Rmax valid subframes. A time-domain interval between a start position of the PDCCH search space period and a start position of an NPDCCH search space is $G*Rmax*\alpha_{offset}$, and a maximum of 15 PDCCH candidates may exist in one NPDCCH search space period. A repetition level (repetition level) of each PDCCH candidate is R. For the repetition levels corresponding to the 15 PDCCH candidates, refer to FIG. 1. Details are not described herein 9. TCI State:

A TCI state may be associated with one or more antenna ports. For example, if a TCI state is used to indicate transmission of an uplink shared channel (physical uplink shared channel, PDSCH), the TCI state is associated with an antenna port for transmitting the PDSCH. If a TCI state is used to indicate transmission of a PDCCH, the TCI state is associated with an antenna port for transmitting the PDCCH, and the antenna port for transmitting the PDCCH is used for channel estimation and demodulation of the PDCCH. In addition, the TCI state may be further used to indicate a channel state information reference signal (channel state information RS, CSI-RS) or the like. This is not specifically limited in the embodiments of this application.

Optionally, in the embodiments of this application, the TCI state may be configured by a higher layer. When the TCI state is configured, some RS information such as an identifier of a CSI-RS may be configured in the TCI state. This is not specifically limited herein. In addition, the TCI state is a parameter used to indicate a quasi-colocation relationship between antenna ports. The TCI state indicates a quasi-colocation relationship between an antenna port of an RS corresponding to an identifier configured in the TCI state (for example, an antenna port of a CSI-RS corresponding to an identified CSI-RS resource) and an antenna port for carrying an indicated channel, signal, or the like (for example, a DMRS port of an indicated PDSCH). Optionally, the configuration of the TCI state may further include information about quasi-co-located channel large-scale parameters. For example, the TCI state further includes a quasi-colocation type indication, and the quasi-colocation type is associated with a group (one or more groups) of channel large-scale parameters.

The following describes the technical solutions in the embodiments of this application with reference to the accompanying drawings in the embodiments of this application. Unless otherwise specified, "/" in descriptions of this application represents an "or" relationship between associated objects. For example, A/B may represent A or B. A and B may be singular or plural. In addition, in the descriptions of this application, "a plurality of" means two or more than two unless otherwise specified. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in the embodiments of this application, in the embodiments of this application, terms such as "first" and "second" are used to distinguish between same items or similar items that have basically same functions and purposes. A person skilled in the art may understand that the terms such as "first" and "second" do not limit a quantity or an execution sequence, and the terms such as "first" and "second" do not indicate a definite difference. In addition, in the embodiments of this application, a word such as "example" or "for example" is used to represent giving an example, an illustration, or a description. Any embodiment or design scheme described as "example" or "for example" in the embodiments of this application should not be explained as being more preferred or having more advantages than another embodiment or design scheme. Exactly, use of the word such as "example" or "for example" is intended to present a relative concept in a specific manner for ease of understanding.

The technical solutions in the embodiments of this application may be applied to various communications systems, for example, an orthogonal frequency division multiple access (orthogonal frequency-division multiple access, OFDMA) system, a single carrier frequency division multiple access (single carrier FDMA, SC-FDMA) system, and another system. The terms "system" and "network" can be interchanged with each other. A radio technology such as evolved universal terrestrial radio access (evolved universal terrestrial radio access, E-UTRA) or ultra mobile broadband (ultra mobile broadband, UMB) may be implemented in the OFDMA system. The E-UTRA is an evolved release of a universal mobile telecommunications system (universal mobile telecommunications system, UMTS). The 3rd generation partnership project (3rd generation partnership project, 3GPP) uses a new release of the E-UTRA in long term evolution (long term evolution, LTE) and various versions evolved based on LTE. A 5G communications system is a next-generation communications system under research. The 5G communications system includes a 5G non-standalone (non-standalone, NSA for short) mobile communications system, a 5G standalone (standalone, SA for short) mobile communications system, or both a 5G NSA mobile communications system and a 5G SA mobile communications system. In addition, the communications system is further applicable to a future-oriented communications technology, and is applicable to the technical solutions provided in the embodiments of this application. The foregoing communications systems applicable to this application are merely examples for description, and a communications system applicable to this application is not limited thereto. A general description is provided herein, and details are not described below again.

Figure 2:
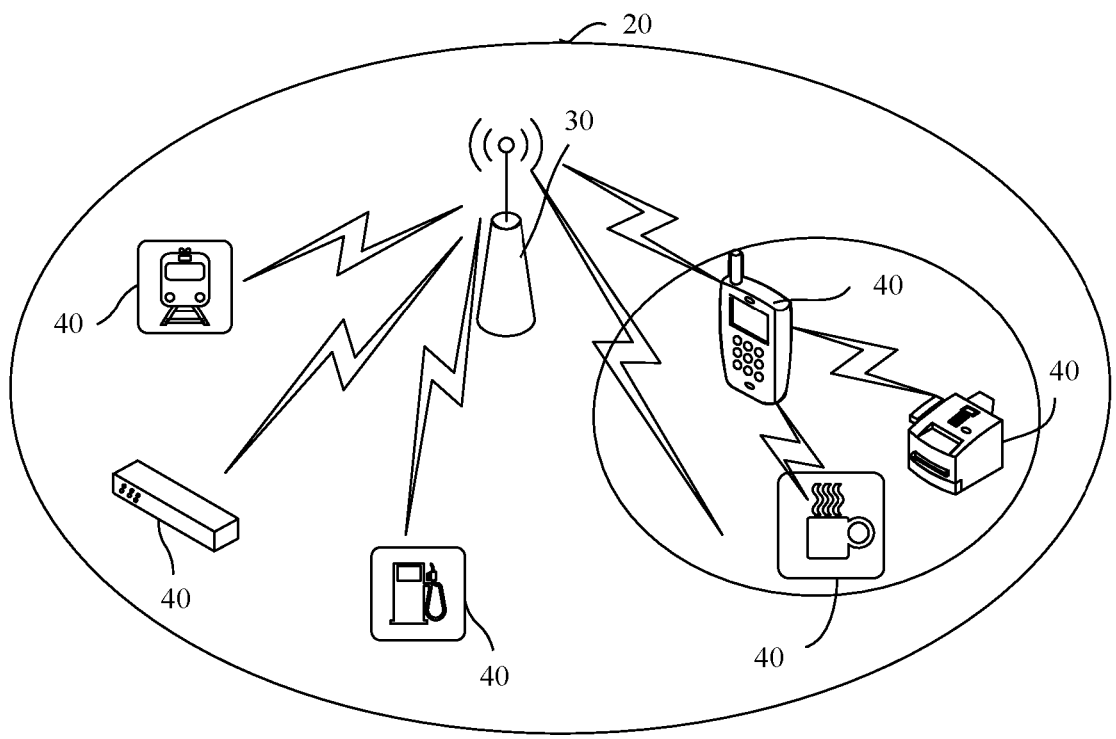
FIG. 2 is a schematic structural diagram of a communications system according to an embodiment of this application.

FIG. 2 shows a communications system according to an embodiment of this application. The communications system 20 includes one or more network devices 30 (in FIG. 2, an example in which the communications system 20 includes one network device 30 is used for description) and one or more terminal devices 40 connected to each network device 30. Optionally, different terminal devices 40 may communicate with each other.

The terminal device 40 in this embodiment of this application may be a device, for example, a terminal or a chip that may be used in the terminal, configured to implement a wireless communication function. The terminal may be user equipment (UE), an access terminal, a terminal unit, a terminal station, a mobile station, a mobile station, a remote station, a remote terminal, a mobile device, a wireless communications device, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control (industrial control), a wireless terminal in self-driving, a wireless terminal in telemedicine (remote medical), a wireless terminal in a smart grid (smart grid), a wireless terminal in transportation safety, a wireless terminal in a smart city, a wireless terminal in a smart home, or the like. The terminal may be movable or fixed.

The network device 30 in this embodiment of this application may be a device that can communicate with the terminal device 40. The network device 30 may include a TRP, a base station, a remote radio unit (remote radio unit, RRU) or a baseband unit (baseband unit, BBU) (which may also be referred to as a digital unit (digital unit, DU)) of a separated base station, a broadband network service gateway (broadband network gateway, BNG), an aggregation switch, a non-3GPP access device, a relay station, an access point, or the like. In FIG. 2, an example in which the network device is a base station is used for description. A general description is provided herein, and details are not described below again. In addition, the base station in the embodiments of this application may be a base transceiver station (base transceiver station, BTS) in a global system for mobile communications (global system for mobile communication, GSM) or code division multiple access (code division multiple access, CDMA) network, an NB (NodeB) in wideband code division multiple access (wideband code division multiple access, WCDMA), an eNB or an eNodeB (evolutional NodeB) in LTE, a radio controller in a cloud radio access network (cloud radio access network, CRAN) scenario, a base station in a 5G communications system, a base station in a future evolved network, or the like. This is not specifically limited herein.

The network device 30 and the terminal device 40 in this embodiment of this application may also be referred to as communications apparatuses, and each may be a general-purpose device or a dedicated device. This is not specifically limited in this embodiment of this application.

A related function of the terminal device 40 or the network device 30 in this embodiment of this application may be implemented by one device, may be jointly implemented by a plurality of devices, or may be implemented by one or more functional modules in one device. This is not specifically limited in this embodiment of this application. It may be understood that the foregoing function may be a network element on a hardware device, a software function run on dedicated hardware, a combination of hardware and software, or a virtualization function instantiated on a platform (for example, a cloud platform).

Figure 3:
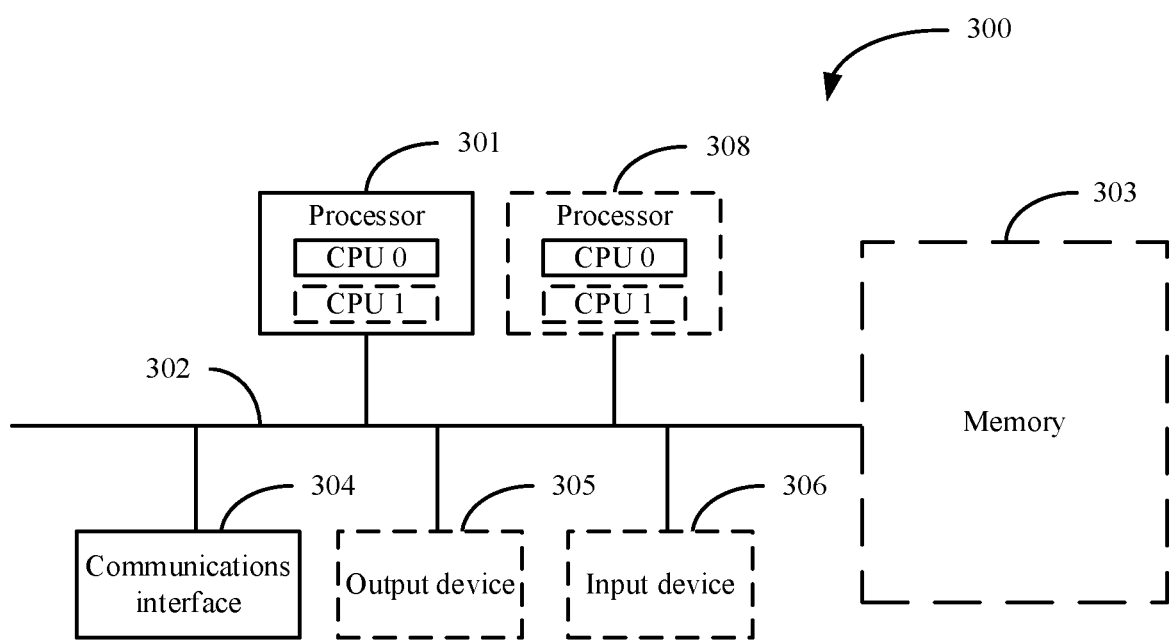
FIG. 3 is a schematic structural diagram of a communications apparatus according to an embodiment of this application.

For example, the related function of the terminal device 40 or the network device 30 in this embodiment of this application may be implemented by a communications apparatus 300 in FIG. 3. FIG. 3 is a schematic structural diagram of a communications apparatus 300 according to an embodiment of this application. The communications apparatus 300 includes one or more processors 301, a communications line 302, and at least one communications interface (in FIG. 3, only an example in which a communications interface 304 and one processor 301 are included is used for description). Optionally, the communications apparatus 300 may further include a memory 303.

The processor 301 may be a general-purpose central processing unit (central processing unit, CPU), a microprocessor, an application-specific integrated circuit (application-specific integrated circuit, ASIC), or one or more integrated circuits configured to control program execution of the solutions in this application.

The communications line 302 may include a path used to connect different components.

The communications interface 304 may be a transceiver module configured to communicate with another device or a communications network such as the Ethernet, a RAN, or a wireless local area network (wireless local area networks, WLAN). For example, the transceiver module may be an apparatus such as a transceiver or a transceiver device. Optionally, the communications interface 304 may alternatively be a transceiver circuit located inside the processor 301, and is configured to implement signal input and signal output of the processor.

The memory 303 may be an apparatus having a storage function, for example, may be a read-only memory (read-only memory, ROM) or another type of static storage device capable of storing static information and instructions, or a random access memory (random access memory, RAM) or another type of dynamic storage device capable of storing information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a blue-ray disc, and the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor by using the communications line 302. Alternatively, the memory may be integrated with the processor.

The memory 303 is configured to store computer-executable instructions for executing the solutions in this application, and the processor 301 controls execution of the computer-executable instructions. The processor 301 is configured to execute the computer-executable instructions stored in the memory 303, to implement a DCI transmission method provided in the embodiments of this application.

Alternatively, in this embodiment of this application, the processor 301 may perform related processing functions in the DCI transmission method provided in the following embodiments of this application. The communications interface 304 is responsible for communicating with another device or a communications network. This is not specifically limited in this embodiment of this application.

The computer-executable instruction in this embodiment of this application may also be referred to as application program code. This is not specifically limited in this embodiment of this application.

During specific implementation, in an embodiment, the processor 301 may include one or more CPUs, for example, a CPU 0 and a CPU 1 in FIG. 3.

During specific implementation, in an embodiment, the communications apparatus 300 may include a plurality of processors, for example, a processor 301 and a processor 308 in FIG. 3. Each of the processors may be a single-core (single-CPU) processor, or may be a multi-core (multi-CPU) processor. The processor herein may be one or more devices, circuits, and/or processing cores configured to process data (for example, a computer program instruction).

During specific implementation, in an embodiment, the communications apparatus 300 may further include an output device 305 and an input device 306. The output device 305 communicates with the processor 301, and may display information in a plurality of manners.

The communications apparatus 300 may be a general-purpose apparatus or a dedicated apparatus. For example, the communications apparatus 300 may be a desktop computer, a portable computer, a network server, a personal digital assistant (personal digital assistant, PDA), a mobile phone, a tablet computer, a wireless terminal device, an embedded device, or a device having a structure similar to that in FIG. 4. A type of the communications apparatus 300 is not limited in this embodiment of this application.

With reference to the schematic structural diagram of the communications apparatus 300 shown in FIG. 3, an example in which the communications apparatus 300 is the terminal device 40 in FIG. 2 is used. For example, FIG. 4 shows a specific structural form of the terminal device 40 according to an embodiment of this application.

Figure 4:
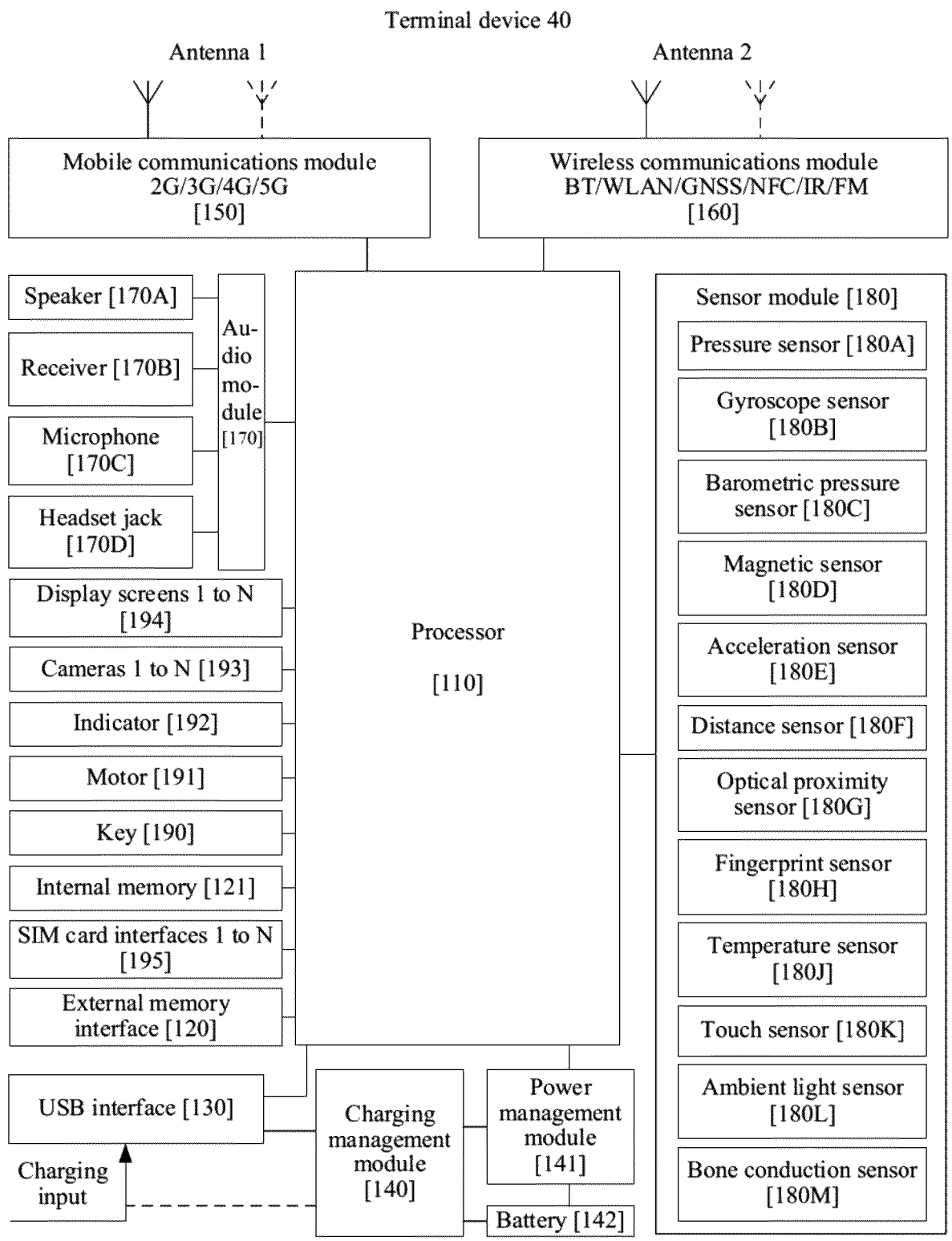
FIG. 4 is a first schematic structural diagram of a terminal device according to an embodiment of this application.

In some embodiments, a function of the processor 301 in FIG. 3 may be implemented by a processor 110 in FIG. 4.

In some embodiments, a function of the communications interface 304 in FIG. 3 may be implemented by an antenna 1, an antenna 2, a mobile communications module 150, a wireless communications module 160, and the like in FIG. 4.

The antenna 1 and the antenna 2 are configured to transmit and receive an electromagnetic wave signal. Each antenna in the terminal device 40 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a solution used for wireless communication that includes 2G, 3G, 4G, 5G, and the like and that is applied to the terminal device 40. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and transfer a processed electromagnetic wave to a modem processor for demodulation. The mobile communications module 150 may further amplify a signal modulated by the modem processor, and convert the signal into an electromagnetic wave for radiation by using the antenna 1. In some embodiments, at least some functional modules in the mobile communications module 150 may be disposed in the processor 110. In some embodiments, at least some functional modules in the mobile communications module 150 and at least some modules in the processor 110 may be disposed in a same device.

The wireless communications module 160 may be one or more devices that integrate at least one communication processing module. The wireless communications module 160 receives an electromagnetic wave by using the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation by using the antenna 2.

In some embodiments, the antenna 1 of the terminal device 40 is coupled to the mobile communications module 150, and the antenna 2 is coupled to the wireless communications module 160, so that the terminal device 40 can communicate with a network and another device by using a wireless communications technology.

In some embodiments, a function of the memory 303 in FIG. 3 may be implemented by an internal memory 121, an external memory (such as a micro SD card) connected to an external memory interface 120 in FIG. 4, or the like.

In some embodiments, a function of the output device 305 in FIG. 3 may be implemented by a display screen 194 in FIG. 4. The display screen 194 includes a display panel.

In some embodiments, a function of the input device 306 in FIG. 3 may be implemented by a mouse, a keyboard, a touchscreen device, or a sensor module 180 in FIG. 4. In some embodiments, as shown in FIG. 4, the terminal device 40 may further include one or more of an audio module 170, a camera 193, an indicator 192, a motor 191, a key 190, a SIM card interface 195, a USB interface 130, a charging management module 140, a power management module 141, and a battery 142. This is not specifically limited in this embodiment of this application.

It may be understood that the structure shown in FIG. 4 does not constitute a specific limitation on the terminal device 40. For example, in some other embodiments of this application, the terminal device 40 may include more or fewer components than those shown in the figure, or some components may be combined, or some components may be split, or the components may be differently arranged. The components shown in the figure may be implemented by hardware, software, or a combination of software and hardware.

Figure 5:
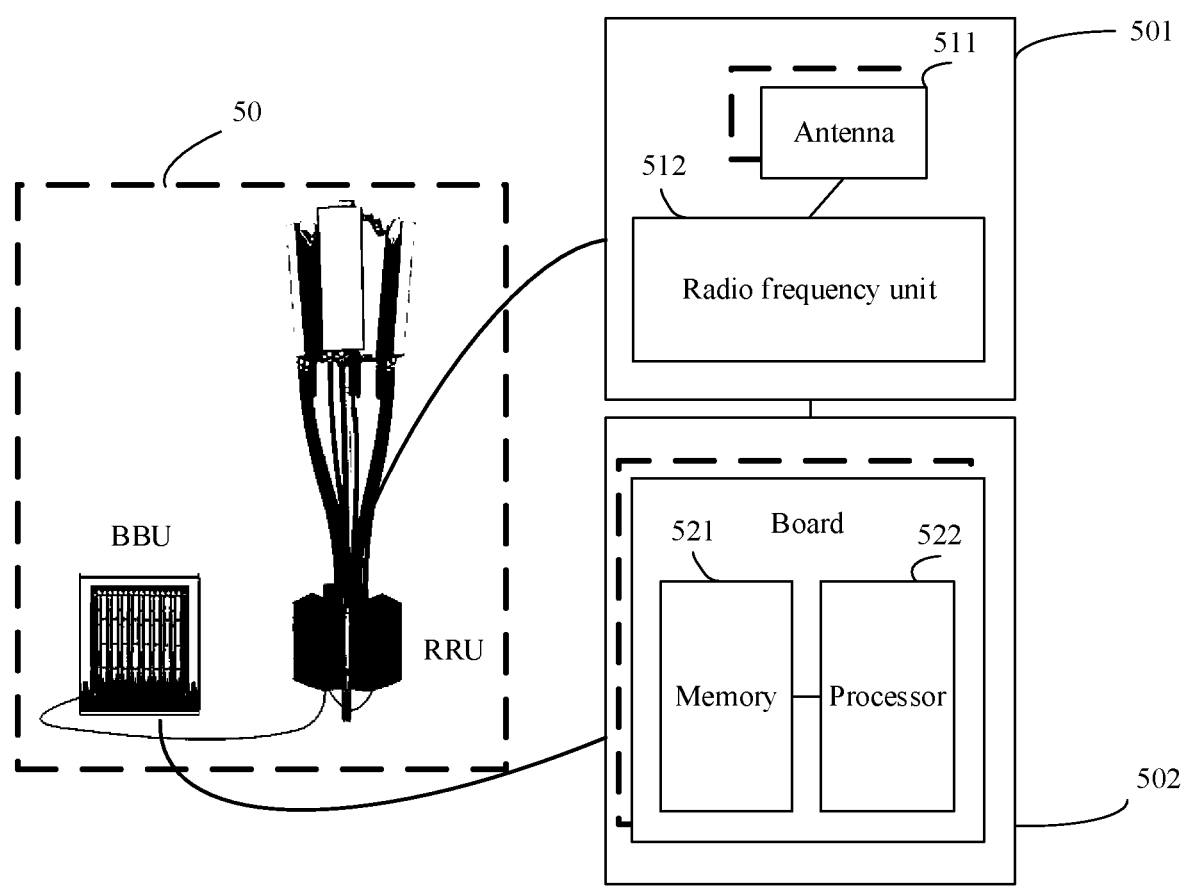
FIG. 5 is a schematic structural diagram of a base station according to an embodiment of this application.

Alternatively, with reference to the schematic structural diagram of the communications apparatus 300 shown in FIG. 3, an example in which the communications apparatus 300 is the network device 30 in FIG. 2 is used. For example, FIG. 5 shows a specific structural form of a base station 50 according to an embodiment of this application.

The base station 50 includes one or more radio frequency units (for example, an RRU 501) and one or more BBUs (which may also be referred to as digital units (digital unit, DU for short)) 502.

The RRU 501 may be referred to as a transceiver unit, a transceiver, a transceiver circuit, a transceiver, or the like, and may include at least one antenna feeder system (that is, antenna) 511 and a radio frequency unit 512. The RRU 501 is mainly configured to: send and receive a radio frequency signal and perform conversion between the radio frequency signal and a baseband signal. In some embodiments, a function of the communications interface 304 in FIG. 3 may be implemented by the RRU 501 in FIG. 5.

The BBU 502 is a control center of the network device, may also be referred to as a processing unit, and is mainly configured to complete baseband processing functions such as channel coding, multiplexing, modulation, and spectrum spreading.

In some embodiments, the BBU 502 may include one or more boards. A plurality of boards may jointly support a radio access network (such as an LTE network) of a single access standard, or may separately support radio access networks (such as an LTE network, a 5G network, or another network) of different access standards. The BBU 502 further includes a memory 521 and a processor 522. The memory 521 is configured to store necessary instructions and data. The processor 522 is configured to control the network device to perform a necessary action. The memory 521 and the processor 522 may serve one or more boards. In other words, a memory and a processor may be separately disposed on each board. Alternatively, a plurality of boards may share a same memory and a same processor. In addition, a necessary circuit may be further disposed on each board. In some embodiments, a function of the processor 301 in FIG. 3 may be implemented by the processor 522 in FIG. 5, and a function of the memory 303 in FIG. 3 may be implemented by the memory 521 in FIG. 5.

Optionally, the RRU 501 and the BBU 502 in FIG. 5 may be physically disposed together, or may be physically disposed separately, for example, the base station is a distributed base station. This is not specifically limited in this embodiment of this application.

Currently, one piece of DCI may be used to schedule data flows sent by a plurality of TRPs. This solution requires that a fast transmission channel be established between the plurality of TRPs to meet real-time interaction between the plurality of TRPs. This clearly imposes relatively high requirements on network deployment. Based on this, an idea that the data flows sent by the plurality of TRPs may be scheduled by using a plurality of pieces of DCI is proposed. However, if the data flows sent by the plurality of TRPs may be scheduled by using a plurality of pieces of DCI, currently, there is no related solution to how the terminal device learns, after receiving one piece of DCI, whether blind detection of DCI needs to be continued. Based on this, the embodiments of this application provide a DCI transmission method. In this solution, a terminal device receives first DCI, where the first DCI includes indication information, and the indication information is used to indicate a first antenna port; then the terminal device assumes, based on the first antenna port and antenna port configuration information, whether second DCI exists. That is, based on the DCI transmission method provided in the embodiments of this application, whether blind detection of DCI needs to be continued may be learned. The following describes in detail, with reference to FIG. 2 to FIG. 5, the DCI transmission method provided in the embodiments of this application.

It should be noted that in the following embodiments of this application, names of messages between network elements, names of parameters in messages, or the like are merely examples, and there may be other names during specific implementation. This is not specifically limited in the embodiments of this application.

Figure 6:
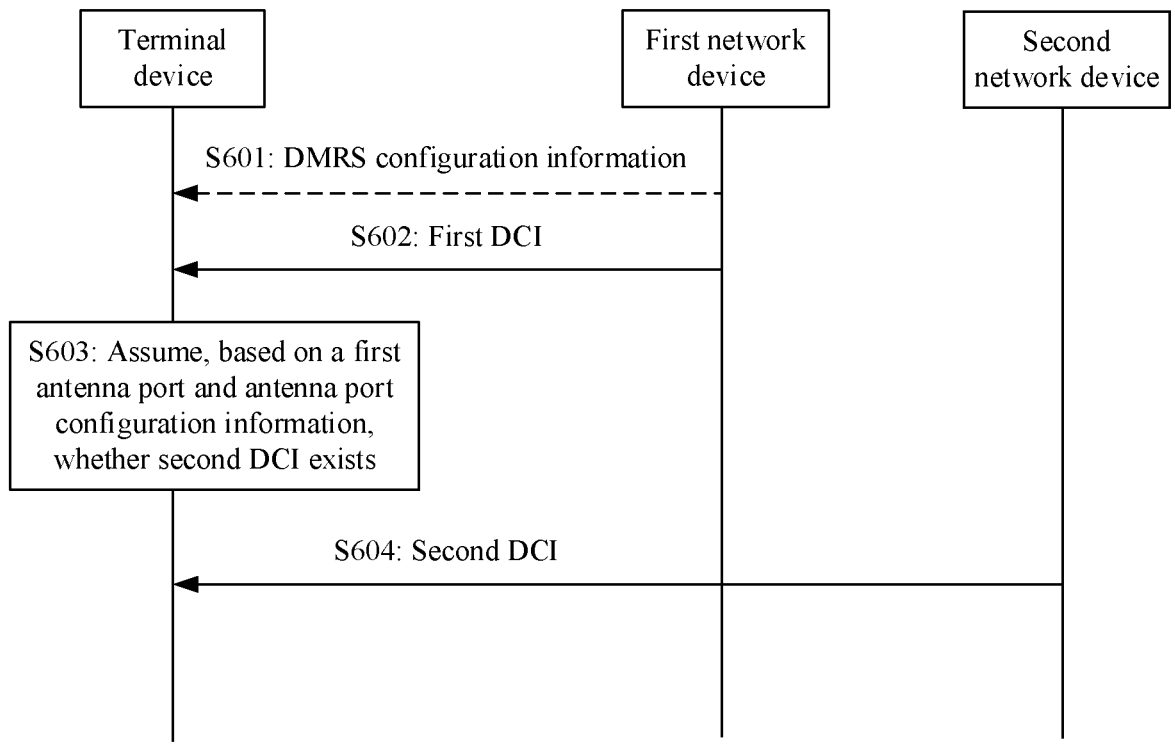
FIG. 6 is a first schematic flowchart of a DCI transmission method according to an embodiment of this application.

FIG. 6 shows a DCI transmission method according to an embodiment of this application. The DCI transmission method includes the following steps.

S601: A first network device sends antenna port configuration information to a terminal device. The terminal device receives the antenna port configuration information from the first network device.

In this embodiment of this application, the first network device may include the antenna port configuration information in higher layer signaling, and send the higher layer signaling to the terminal device. The higher layer signaling may include, for example, radio resource control (radio resource control, RRC) signaling or media access control-control element (media access control-control element, MAC-CE) signaling. This is not specifically limited in this embodiment of this application.

In an implementation, the antenna port configuration information may be DMRS configuration information or other configuration information related to antenna port grouping. In this embodiment of this application, the DMRS configuration information may include one or more of the following:

1. DMRS Type.

In this embodiment of this application, the DMRS type includes a DMRS type 1 or a DMRS type 2.

2. Position of an Additional DMRS.

In this embodiment of this application, DMRSs are classified into a front-loaded DMRS and an additional DMRS. For related descriptions of the front-loaded DMRS and the additional DMRS, refer to the conventional technology. Details are not described herein.

3. Maximum Length of a Symbol Occupied by a DMRS.

4. One or More Scrambling Identifiers.

Certainly, the DMRS configuration information may further include other information. This is not specifically limited in this embodiment of this application.

In another implementation, the antenna port configuration information may alternatively be preset according to a protocol, that is, the network device does not need to send the antenna port configuration information to the terminal device. Step S601 is optional.

S602: The first network device sends first DCI to the terminal device. The terminal device receives the first DCI from the first network device. The first DCI includes indication information 1, and the indication information 1 is used to indicate a first antenna port.

In this embodiment of this application, the indication information 1 may be a value of an antenna port (antenna port) field in the first DCI, and the first antenna port indicated by the indication information 1 is an antenna port for carrying a PDSCH.

In this embodiment of this application, the terminal device may store a mapping relationship between a value (value) indicated by an antenna port field in DCI and an antenna port index. For example, when a total quantity of codewords scheduled by DCI is 1, a DMRS type is the DMRS type 1, and a maximum length of a symbol occupied by a DMRS is 2, a mapping relationship between a value (value) indicated by an antenna port field in the DCI and an antenna port index may be shown in Table 1. Alternatively, when a total quantity of codewords scheduled by DCI is 1, a DMRS type is the DMRS type 2, and a maximum length of a symbol occupied by a DMRS is 2, a mapping relationship between a value (value) indicated by an antenna port field in the DCI and an antenna port index may be shown in Table 2. Certainly, an actually used antenna port index may alternatively be an antenna port index {0 to 11}+1000 in Table 1 or Table 2. This is not specifically limited in this embodiment of this application.

TABLE 1

| Value | Antenna port index |
|---|---|
| 0 | 0 |
| 1 | 1 |
| 2 | 0, 1 |
| 3 | 0 |
| 4 | 1 |
| 5 | 2 |
| 6 | 3 |
| 7 | 0, 1 |
| 8 | 2, 3 |
| 9 | 0 to 2 |
| 10 | 0 to 3 |
| 11 | 0, 2 |
| 12 | 0 |
| 13 | 1 |
| 14 | 2 |
| 15 | 3 |
| 16 | 4 |
| 17 | 5 |
| 18 | 6 |
| 19 | 7 |
| 20 | 0, 1 |
| 21 | 2, 3 |
| 22 | 4, 5 |
| 23 | 6, 7 |
| 24 | 0, 4 |
| 25 | 2, 6 |
| 26 | 0, 1, 4 |
| 27 | 2, 3, 6 |
| 28 | 0, 1, 4, 5 |
| 29 | 2, 3, 6, 7 |

TABLE 1-continued

| Value | Antenna port index |
|---|---|
| 30 | 0, 2, 4, 6 |
| 31 | 0 |

TABLE 2

| Value | Antenna port index |
|---|---|
| 0 | 0 |
| 1 | 1 |
| 2 | 0, 1 |
| 3 | 0 |
| 4 | 1 |
| 5 | 2 |
| 6 | 3 |
| 7 | 0, 1 |
| 8 | 2, 3 |
| 9 | 0 to 2 |
| 10 | 0 to 3 |
| 11 | 0 |
| 12 | 1 |
| 13 | 2 |
| 14 | 3 |
| 15 | 4 |
| 16 | 5 |
| 17 | 0, 1 |
| 18 | 2, 3 |
| 19 | 4, 5 |
| 20 | 0 to 2 |
| 21 | 3 to 5 |
| 22 | 0 to 3 |
| 23 | 0, 2 |
| 24 | 0 |
| 25 | 1 |
| 26 | 2 |
| 27 | 3 |
| 28 | 4 |
| 29 | 5 |
| 30 | 6 |
| 31 | 7 |
| 32 | 8 |
| 33 | 9 |
| 34 | 10 |
| 35 | 11 |
| 36 | 0, 1 |
| 37 | 2, 3 |
| 38 | 4, 5 |
| 39 | 6, 7 |
| 40 | 8, 9 |
| 41 | 10, 11 |
| 42 | 0, 1, 6 |
| 43 | 2, 3, 8 |
| 44 | 4, 5, 10 |
| 45 | 0, 1, 6, 7 |
| 46 | 2, 3, 8, 9 |
| 47 | 4, 5, 10, 11 |
| 48 | 0 |
| 49 | 1 |
| 50 | 6 |
| 51 | 7 |
| 52 | 0, 1 |
| 53 | 6, 7 |
| 54 | 0, 1 |
| 55 | 2, 3 |
| 56 | 6, 7 |
| 57 | 8, 9 |
| 58 to 63 | Reserved |

It should be noted that Table 1 and Table 2 indicate a mapping relationship between a value indicated by an antenna port field and an antenna port index. That is, when a value indicated by an antenna port field is a value in the first column of a row in the table, a correspondingly indicated antenna port index is an index listed in the second column of the same row.

Certainly, row transformation or column transformation may be performed on both Table 1 and Table 2. If row transformation is performed, values may be re-sorted in ascending order. For example, in Table 1 or Table 2, an antenna port index corresponding to the value=0 is 0, and an antenna port index corresponding to the value=1 is 1. However, actually, the antenna port index corresponding to the value=0 may alternatively be 1, and the antenna port index corresponding to the value=1 may alternatively be 0. This is not specifically limited in this embodiment of this application. The description is also applicable to other tables in the embodiments of this application. A general description is provided herein, and details are not described below again.

In this embodiment of this application, the terminal device may further store a mapping relationship among a value (value) indicated by an antenna port field in DCI, a total quantity of DMRS code division multiplexing (code division multiplexing) groups that are not used to transmit data (number of DMRS CDM group(s) without data), and a quantity of front-loaded DMRS symbols (number of front-load symbols), and the like. For details, refer to the 3GPP technical standard (technical standard, TS) 38.212 V15.5.0 (2019-03). Details are not described herein.

The mapping relationships shown in Table 1 and Table 2 may be defined in a protocol, and prestored in the terminal device, or may be configured by the network device for the terminal device. This is not specifically limited in this embodiment of this application.

S603: The terminal device assumes, based on the first antenna port and the antenna port configuration information, whether second DCI exists.

Based on different antenna port configuration information, this embodiment of this application may provide the following three implementations.

Optionally, in this embodiment of this application, the antenna port configuration information may be defined in a protocol, and preconfigured on the terminal device, or may be configured by the network device for the terminal device. This is not specifically limited in this embodiment of this application.

Manner 1: The antenna port configuration information may include an index of a CDM group to which each of a plurality of antenna ports belongs and a maximum quantity of CDM groups that is supported by the terminal device.

For example, for a 1-symbol DMRS type 1, a maximum of two CDM groups are included. Indexes of antenna ports included in a CDM group 0 are 10, 11, and indexes of antenna ports included in a CDM group 1 are {2, 3}.

For a 2-symbol DMRS type 1, a maximum of two CDM groups are included. Indexes of antenna ports included in a CDM group 0 are 10, 1, 4, 51, and indexes of antenna ports included in a CDM group 1 are {2, 3, 6, 7}.

For a 1-symbol DMRS type 2, a maximum of three CDM groups are included. Indexes of antenna ports included in a CDM group 0 are {0, 1}, indexes of antenna ports included in a CDM group 1 are {2, 3}, and indexes of antenna ports included in a CDM group 2 are {4, 5}.

For a 2-symbol DMRS type 2, a maximum of three CDM groups are included. Indexes of antenna ports included in a CDM group 0 are {0, 1, 6, 7}, indexes of antenna ports included in a CDM group 1 are {2, 3, 8, 9}, and indexes of antenna ports included in a CDM group 2 are {4, 5, 10, 11}.

Certainly, an actually used antenna port index may alternatively be a number {0 to 11}+1000 in the foregoing example. That is, in this embodiment of this application, antenna port numbers 0 to 11 are equivalent to antenna port numbers 1000 to 1011. For example, an index of a CDM group to which each of a plurality of antenna ports corresponding to the DMRS type 1 belongs may be shown in Table 3, and an index of a CDM group to which each of a plurality of antenna ports corresponding to the DMRS type 2 belongs may be shown in Table 4.

TABLE 3

| Antenna port index | CDM group |
| --- | --- |
| 1000 | 0 |
| 1001 | 0 |
| 1002 | 1 |
| 1003 | 1 |
| 1004 | 0 |
| 1005 | 0 |
| 1006 | 1 |
| 1007 | 1 |

TABLE 4

| Antenna port index | CDM group |
| --- | --- |
| 1000 | 0 |
| 1001 | 0 |
| 1002 | 1 |
| 1003 | 1 |
| 1004 | 2 |
| 1005 | 2 |
| 1006 | 0 |
| 1007 | 0 |
| 1008 | 1 |
| 1009 | 1 |
| 1010 | 2 |
| 1011 | 2 |

As described above, the mapping relationships shown in Table 3 and Table 4 may be defined in a protocol, and prestored in the terminal device, or may be configured by the network device for the terminal device. This is not specifically limited in this embodiment of this application.

It can be learned from Table 3 that a maximum quantity of CDM groups that corresponds to the DMRS type 1 and that is supported by the terminal device is 2, and a maximum quantity of CDM groups that corresponds to the DMRS type 2 and that is supported by the terminal device is 3. After receiving the DMRS configuration information from the first network device, the terminal device may learn of the DMRS type based on the DMRS configuration information, and may further determine, based on the DMRS type, the maximum quantity of CDM groups that is supported by the terminal device.

In this manner, that the terminal device assumes, based on the first antenna port and the antenna port configuration information, whether the second DCI exists may include: The terminal device determines, based on an index of the first antenna port and the index of the CDM group to which each antenna port belongs (as shown in Table 3 or Table 4), information about a CDM group to which the first antenna port belongs; and the terminal device assumes, based on the information about the CDM group to which the first antenna port belongs and the maximum quantity of CDM groups that is supported by the terminal device, whether the second DCI exists.

In a possible implementation, the information about the CDM group to which the first antenna port belongs includes a quantity of CDM groups to which the first antenna port belongs.

Further, that the terminal device assumes, based on the information about the CDM group and the maximum quantity of CDM groups that is supported by the terminal device, whether the second DCI exists includes: If the quantity of CDM groups to which the first antenna port belongs is less than the maximum quantity of CDM groups that is supported by the terminal device, the terminal device assumes that the second DCI exists; or if the quantity of CDM groups to which the first antenna port belongs is equal to the maximum quantity of CDM groups, the terminal device assumes that the second DCI does not exist.

The following provides descriptions by using several examples.

Figure 7A:
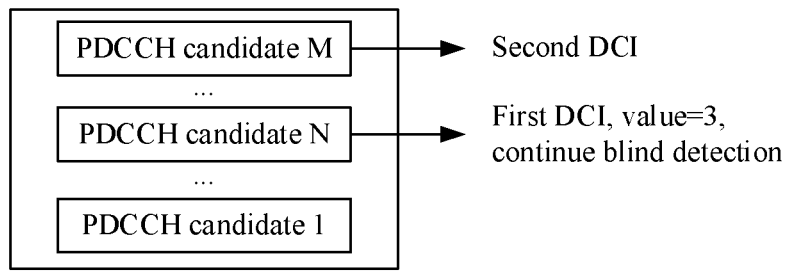
FIG. 7a is a first schematic diagram of DCI detection according to an embodiment of this application.

Example 1: It is assumed that the DMRS type included in the DMRS indication information sent by the first network device to the terminal device is the DMRS type 1, and the maximum length of the symbol occupied by the DMRS is 2. If the value of the antenna port field in the first DCI sent by the first network device to the terminal device is 3, a value of the antenna port field in the first DCI that is detected by the terminal device on a PDCCH candidate N is 3. It can be learned with reference to Table 1 that the index of the first antenna port indicated by the first DCI is 0 (or 1000+0). In this case, it can be learned with reference to Table 3 that the CDM group to which the antenna port whose index is 0 (or 1000+0) belongs is the CDM group 0, that is, only one CDM group is occupied, and the maximum quantity of CDM groups that corresponds to the DMRS type 1 and that is supported by the terminal device is 2. In other words, the quantity of CDM groups to which the first antenna port indicated by the first DCI belongs is less than the maximum quantity of CDM groups that is supported by the terminal device. Therefore, in this case, the terminal device may assume that the second DCI exists, and an antenna port that carries a PDSCH and that is indicated by the second DCI may belong to the CDM group 1. Further, the terminal device may continue to perform blind detection, and may detect the second DCI on a PDCCH candidate M, as shown in FIG. 7a.

Figure 7B:
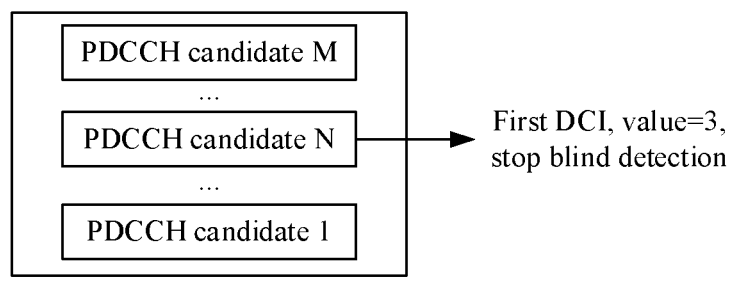
FIG. 7b is a second schematic diagram of DCI detection according to an embodiment of this application.

Alternatively, Example 2: It is assumed that the DMRS type included in the DMRS indication information sent by the first network device to the terminal device is the DMRS type 1, and the maximum length of the symbol occupied by the DMRS is 2. If the value of the antenna port field in the first DCI sent by the first network device to the terminal device is 30, a value of the antenna port field in the first DCI that is detected by the terminal device on a PDCCH candidate N is 30. It can be learned with reference to Table 1 that indexes of the first antenna port indicated by the first DCI are 0 (or 1000+0), 2 (or 1000+2), 4 (or 1000+4), and 6 (or 1000+6). In this case, it can be learned with reference to Table 3 that a CDM group to which the antenna port whose index is 0 (or 1000+0) belongs is the CDM group 0, a CDM group to which the antenna port whose index is 2 (or 1000+2) belongs is the CDM group 1, a CDM group to which the antenna port whose index is 4 (or 1000+4) belongs is the CDM group 0, and a CDM group to which the antenna port whose index is 6 (or 1000+6) belongs is the CDM group 1. In other words, the CDM groups to which the first antenna port indicated by the first DCI belongs include the CDM group 0 and the CDM group 1, and two CDM groups are occupied in total. The maximum quantity of CDM groups that corresponds to the DMRS type 1 and that is supported by the terminal device is 2. In other words, the quantity of CDM groups to which the first antenna port indicated by the first DCI belongs is equal to the maximum quantity of CDM groups that is supported by the terminal device. Therefore, in this case, the terminal device may assume that the second DCI does not exist, and may stop blind detection, thereby saving system resources, as shown in FIG. 7b.

In another possible implementation, the information about the CDM group to which the first antenna port belongs includes an index of the CDM group to which the first antenna port belongs.

In this case, in one processing manner, that the terminal device assumes, based on the information about the CDM group and the maximum quantity of CDM groups that is supported by the terminal device, whether the second DCI exists includes: If the index of the CDM group to which the first antenna port belongs is the same as an index of a CDM group corresponding to the maximum quantity of CDM groups that is supported by the terminal device, the terminal device assumes that the second DCI does not exist; or if the index of the CDM group to which the first antenna port belongs is not completely the same as an index of a CDM group corresponding to the maximum quantity of CDM groups that is supported by the terminal device, the terminal device assumes that the second DCI exists.

For example, for the DMRS type 1, indexes of CDM groups corresponding to the maximum quantity of CDM groups that is supported by the terminal device are 0+1 (that is, the CDM group 0 and the CDM group 1). Therefore, when the index of the CDM group to which the first antenna port indicated by the received first DCI belongs is 0 or 1, it may be assumed that the second DCI exists. Alternatively, when indexes of CDM groups to which the first antenna port indicated by the received first DCI belongs are 0 and 1, it may be assumed that the second DCI does not exist.

Alternatively, for example, for the DMRS type 2, indexes of CDM groups corresponding to the maximum quantity of CDM groups that is supported by the terminal device is 0+1+2 (that is, the CDM group 0, the CDM group 1, and the CDM group 2). Therefore, when the index of the CDM group to which the first antenna port indicated by the received first DCI belongs is 0, 1, 2, 0+1, 0+2, or 1+2, it may be assumed that the second DCI exists. Alternatively, when indexes of CDM groups to which the first antenna port indicated by the received first DCI belongs are 0+1+2, it may be assumed that the second DCI does not exist.

In this case, in another processing manner, that the terminal device assumes, based on the information about the CDM group and the maximum quantity of CDM groups that is supported by the terminal device, whether the second DCI exists includes: If the index of the CDM group to which the first antenna port belongs is the same as an index of a CDM group corresponding to the maximum quantity of CDM groups that is supported by the terminal device, the terminal device assumes that the second DCI does not exist; or if the index of the CDM group to which the first antenna port belongs is not completely the same as an index of a CDM group corresponding to the maximum quantity of CDM groups that is supported by the terminal device, and the index of the CDM group to which the first antenna port belongs satisfies a specified rule, the terminal device assumes that the second DCI exists; or if the index of the CDM group to which the first antenna port belongs is not completely the same as an index of a CDM group corresponding to the maximum quantity of CDM groups that is supported by the terminal device, and the index of the CDM group to which the first antenna port belongs does not satisfy a specified rule, the terminal device assumes that the second DCI does not exist.

The following provides descriptions by using several examples.

Example 1: It is assumed that the specified rule is: PDSCHs carried on antenna ports in the CDM group 0 and the CDM group 1 may come from a same TRP. However, a PDSCH carried on an antenna port in the CDM group 2 and the PDSCHs carried on the antenna ports in the CDM group 0 and the CDM group 1 cannot come from a same TRP. That is, TCI states corresponding to the antenna ports in the CDM group 0 and the CDM group 1 are the same, and a TCI state corresponding to the antenna port in the CDM group 2 is the same as those corresponding to the antenna ports in the CDM group 0 and the CDM group 1.

For the DMRS type 1, indexes of CDM groups corresponding to the maximum quantity of CDM groups that is supported by the terminal device are 0+1 (that is, the CDM group 0 and the CDM group 1). Therefore, when the index of the CDM group to which the first antenna port indicated by the received first DCI belongs is 0 or 1, it may be assumed that the second DCI exists. Alternatively, when indexes of CDM groups to which the first antenna port indicated by the received first DCI belongs are 0 and 1, it may be assumed that the second DCI does not exist.

For the DMRS type 2, indexes of CDM groups corresponding to the maximum quantity of CDM groups that is supported by the terminal device are 0+1+2 (that is, the CDM group 0, the CDM group 1, and the CDM group 2). Therefore, when the index of the CDM group to which the first antenna port indicated by the received first DCI belongs is 0, 1, 2, or 0+1, it may be assumed that the second DCI exists. Alternatively, when indexes of CDM groups to which the first antenna port indicated by the received first DCI belongs are 1+2, 0+2, or 0+1+2, it may be assumed that the second DCI does not exist. An inferred mapping result of the DMRS type, the CDM group corresponding to the first DCI, a CDM group corresponding to the second DCI, and a total quantity of DCI may be shown in Table 5.

TABLE 5

| | CDM group corresponding to first DCI | CDM group corresponding to second DCI | Total quantity of DCI |
|---|---|---|---|
| DMRS type 1 | 0 | 1 | 2 |
| | 1 | 0 | 2 |
| | 0, 1 | None | 1 |
| | None | 0, 1 | 1 |
| DMRS type 2 | 0 | 1 | 2 |
| | 0 | 2 | 2 |
| | 1 | 0 | 2 |
| | 1 | 2 | 2 |
| | 2 | 0 | 2 |
| | 2 | 1 | 2 |
| | 0, 1 | 2 | 2 |
| | 1, 2 | None | 1 |
| | 0, 2 | None | 1 |
| | 0, 1, 2 | None | 1 |
| | None | 1, 2 | 1 |
| | None | 0, 2 | 1 |
| | None | 0, 1, 2 | 1 |

In correspondence to the foregoing example, it is assumed that the DMRS type included in the DMRS indication information sent by the first network device to the terminal device is the DMRS type 1. If the value of the antenna port field in the first DCI sent by the first network device to the terminal device is 3, a value of the antenna port field in the first DCI that is detected by the terminal device on a PDCCH candidate N is 3. It can be learned with reference to Table 1 that the index of the first antenna port indicated by the first DCI is 0 (or 1000+0). In this case, it can be learned with reference to Table 3 that a CDM group to which the antenna port whose index is 0 (or 1000+0) belongs is the CDM group 0. Further, it can be learned with reference to Table 5 that if the CDM group corresponding to the first DCI is the CDM group 0, the terminal device may assume that the second DCI exists, that is, the terminal device may continue to perform blind detection.

Example 2: It is assumed that the specified rule is: PDSCHs carried on antenna ports in the CDM group 1 and the CDM group 2 may come from a same TRP. However, a PDSCH carried on an antenna port in the CDM group 0 and the PDSCHs carried on the antenna ports in the CDM group 1 and the CDM group 2 cannot come from a same TRP. That is, TCI states corresponding to the antenna ports in the CDM group 1 and the CDM group 2 are the same, and a TCI state corresponding to the antenna port in the CDM group 0 is the same as those corresponding to the antenna ports in the CDM group 1 and the CDM group 2.

For the DMRS type 1, indexes of CDM groups corresponding to the maximum quantity of CDM groups that is supported by the terminal device are 0+1 (that is, the CDM group 0 and the CDM group 1). Therefore, when the index of the CDM group to which the first antenna port indicated by the received first DCI belongs is 0 or 1, it may be assumed that the second DCI exists. Alternatively, when indexes of CDM groups to which the first antenna port indicated by the received first DCI belongs are 0 and 1, it may be assumed that the second DCI does not exist.

For the DMRS type 2, indexes of CDM groups corresponding to the maximum quantity of CDM groups that is supported by the terminal device are 0+1+2 (that is, the CDM group 0, the CDM group 1, and the CDM group 2). Therefore, when the index of the CDM group to which the first antenna port indicated by the received first DCI belongs is 0, 1, 2, or 1+2, it may be assumed that the second DCI exists. Alternatively, when indexes of CDM groups to which the first antenna port indicated by the received first DCI belongs are 0+1, 0+2, or 0+1+2, it may be assumed that the second DCI does not exist. An inferred mapping result of the DMRS type, the CDM group corresponding to the first DCI, a CDM group corresponding to the second DCI, and a total quantity of DCI may be shown in Table 6.

TABLE 6

| | CDM group corresponding to first DCI | CDM group corresponding to second DCI | Total quantity of DCI |
|---|---|---|---|
| DMRS type 1 | 0 | 1 | 2 |
| | 1 | 0 | 2 |
| | 0, 1 | None | 1 |
| | None | 0, 1 | 1 |
| DMRS type 2 | 0 | 1 | 2 |
| | 0 | 2 | 2 |
| | 1 | 0 | 2 |
| | 1 | 2 | 2 |
| | 2 | 0 | 2 |
| | 2 | 1 | 2 |
| | 0, 1 | None | 1 |
| | 1, 2 | 0 | 2 |
| | 0, 2 | None | 1 |
| | 0, 1, 2 | None | 1 |
| | None | 0, 1 | 1 |
| | 0 | 1, 2 | 2 |
| | None | 0, 2 | 1 |

In correspondence to the foregoing example, it is assumed that the DMRS type included in the DMRS indication information sent by the first network device to the terminal device is the DMRS type 1. If the value of the antenna port field in the first DCI sent by the first network device to the terminal device is 30, a value of the antenna port field in the first DCI that is detected by the terminal device on a PDCCH candidate N is 30. It can be learned with reference to Table 1 that indexes of the first antenna port indicated by the first DCI are 0 (or 1000+0), 2 (or 1000+2), 4 (or 1000+4), and 6 (or 1000+6). In this case, it can be learned with reference to Table 3 that a CDM group to which the antenna port whose index is 0 (or 1000+0) belongs is the CDM group 0, a CDM group to which the antenna port whose index is 2 (or 1000+2) belongs is the CDM group 1, a CDM group to which the antenna port whose index is 4 (or 1000+4) belongs is the CDM group 0, and a CDM group to which the antenna port whose index is 6 (or 1000+6) belongs is the CDM group 1. In other words, the CDM groups to which the first antenna port indicated by the first DCI belongs include the CDM group 0 and the CDM group 1. Further, it can be learned with reference to Table 6 that if the CDM groups corresponding to the first DCI are the CDM group 0 and the CDM group 1, the terminal device may assume that the second DCI does not exist, that is, the terminal device may stop blind detection, thereby saving system resources.

In the foregoing two examples, for both the DMRS type 1 and the DMRS type 2, if an antenna port indicated by received DCI belongs to only one CDM group (for example, the CDM group 0, the CDM group 1, or the CDM group 2), it is assumed that other DCI exists. If CDM groups to which an antenna port indicated by received DCI belongs are the CDM group 0 and the CDM group 1, it is assumed that the second DCI does not exist. For other possible combinations, determining results corresponding to Table 5 and Table 6 are different.

In addition, optionally, in Table 6, a determining rule for the DMRS type 1 is just a subset of a determining rule for the DMRS type 2. In this case, when assuming whether the second DCI exists, the terminal device may not consider the DMRS type. A general description is provided herein, and details are not described below again.

It should be noted that, in the foregoing example, although it is assumed that PDSCHs carried on antenna ports in some CDM groups cannot come from a same TRP, the assumption is based on a premise that scheduling is performed based on two pieces of DCI. If it is predefined that PDSCHs carried on antenna ports in the CDM group 0 and CDM group 1 come from a same TRP, a case in which CDM groups to which antenna ports indicated by one piece of DCI for scheduling by the network device belong include the CDM group 0 and the CDM group 2 is also allowed. This is a case of scheduling based on a single piece of DCI. However, in this case, other DCI cannot be used to schedule a PDSCH in a same time unit. A general description is provided herein.

Manner 2: The antenna port configuration information may include one or more antenna port groups, and each antenna port group includes one or more antenna ports.

In this manner, that the terminal device assumes, based on the first antenna port and the antenna port configuration information, whether the second DCI exists includes: If the index of the first antenna port belongs to a part of the antenna port groups, the terminal device assumes that the second DCI exists; or if the index of the first antenna port belongs to all of the antenna port groups, the terminal device assumes that the second DCI does not exist.

For example, for the 1-symbol DMRS type 1, the one or more antenna port groups may include an antenna port group 1 and an antenna port group 2, indexes of antenna ports included in the antenna port group 1 are {0, 1}, and indexes of antenna ports included in the antenna port group 2 are {2, 3}. Therefore, when the index of the first antenna port indicated by the received first DCI is one or more of {0, 1} or one or more of {2, 3}, it may be assumed that the second DCI exists. Alternatively, when indexes of CDM groups to which the first antenna port indicated by the received first DCI belongs are one or more of {0, 1} and one or more of {2, 3}, it may be assumed that the second DCI does not exist.

Alternatively, in this manner, that the terminal device assumes, based on the first antenna port and the antenna port configuration information, whether the second DCI exists includes: If the index of the first antenna port belongs to all of the antenna port groups, the terminal device assumes that the second DCI does not exist; or if the index of the first antenna port belongs to a part of the antenna port groups, and the index of the first antenna port does not satisfy a specified rule, the terminal device assumes that the second DCI does not exist; or if the index of the first antenna port belongs to a part of the antenna port groups, and the index of the first antenna port satisfies a specified rule, the terminal device assumes that the second DCI exists.

For example, it is assumed that the specified rule is: PDSCHs carried on antenna ports in the CDM group 0 and the CDM group 1 may come from a same TRP. However, a PDSCH carried on an antenna port in the CDM group 2 and the PDSCHs carried on the antenna ports in the CDM group 0 and the CDM group 1 cannot come from a same TRP. That is, TCI states corresponding to the antenna ports in the CDM group 0 and the CDM group 1 are the same, and a TCI state corresponding to the antenna port in the CDM group 2 is the same as those corresponding to the antenna ports in the CDM group 0 and the CDM group 1. In this case, for the 1-symbol DMRS type, an inferred mapping result of the DMRS type, the index of the antenna port indicated by the first DCI, an index of an antenna port indicated by the second DCI, and a total quantity of DCI may be shown in Table 7.

TABLE 7

| | Index of an antenna port indicated by first DCI | Index of an antenna port indicated by second DCI | Total quantity of DCI |
|---|---|---|---|
| DMRS type 1 | One or more of {0, 1} | One or more of {2, 3} | 2 |
| | One or more of {2, 3} | One or more of {0, 1} | 2 |
| | One or more of {0, 1} and one or more of {2, 3} | None | 1 |
| | None | 0, 1 | 1 |
| DMRS type 2 | One or more of {0, 1} | One or more of {2, 3} | 2 |
| | One or more of {0, 1} | One or more of {4, 5} | 2 |
| | One or more of {2, 3} | One or more of {0, 1} | 2 |
| | One or more of {2, 3} | One or more of {4, 5} | 2 |
| | One or more of {4, 5} | One or more of {0, 1} | 2 |
| | One or more of {4, 5} | One or more of {2, 3} | 2 |
| | One or more of {0, 1} and one or more of {2, 3} | One or more of {4, 5} | 2 |
| | One or more of {2, 3} and one or more of {4, 5} | None | 1 |
| | One or more of {0, 1} and one or more of {4, 5} | None | 1 |
| | One or more of {0, 1}, one or more of {2, 3}, and one or more of {4, 5} | None | 1 |
| | None | One or more of {2, 3} and one or more of {4, 5} | 1 |
| | None | One or more of {0, 1} and one or more of {4, 5} | 1 |
| | None | One or more of {0, 1}, one or more of {2, 3}, and one or more of {4, 5} | 1 |

Certainly, an actually used antenna port index may alternatively be a number {0 to 5}+1000 in the foregoing example. This is not specifically limited in this embodiment of this application.

In correspondence to the foregoing example, it is assumed that the DMRS type included in the DMRS indication information sent by the first network device to the terminal device is the DMRS type 1. If the value of the antenna port field in the first DCI sent by the first network device to the terminal device is 3, a value of the antenna port field in the first DCI that is detected by the terminal device on a PDCCH candidate N is 3. It can be learned with reference to Table 1 that the index of the first antenna port indicated by the first DCI is 0 (or 1000+0). In this case, it can be learned with reference to Table 7 that the terminal device may assume that the second DCI exists, that is, the terminal device may continue to perform blind detection.

Alternatively, in correspondence to the foregoing example, it is assumed that the DMRS type included in the DMRS indication information sent by the first network device to the terminal device is the DMRS type 1. If the value of the antenna port field in the first DCI sent by the first network device to the terminal device is 8, a value of the antenna port field in the first DCI that is detected by the terminal device on a PDCCH candidate N is 11. It can be learned with reference to Table 1 that indexes of the first antenna port indicated by the first DCI are 0 (or 1000+0) and 2 (or 1000+2). In this case, it can be learned with reference to Table 7 that the terminal device may assume that the second DCI does not exist, that is, the terminal device stops continuing to perform blind detection.

In this embodiment of this application, when assuming whether the second DCI exists, the terminal device may further consider information such as a quantity of TCI corresponding to the first DCI (for example, whether the quantity is greater than 1) or a total quantity of DMRS layers. This is not specifically limited in this embodiment of this application.

For example, it is assumed that two pieces of DCI each are used to schedule a PDSCH from one TRP, and a quantity of TCI states indicated in one piece of DCI is 1 (especially, a quantity of TCIs for one time-frequency unit is 1). In this case, if the quantity of TCI states indicated in the first DCI received by the terminal device is 1, the terminal device may assume that the second DCI exists; or if the quantity of TCI states indicated in the first DCI received by the terminal device is 2, the terminal device may assume that the second DCI does not exist.

Alternatively, for example, assuming that a total quantity of codewords scheduled by two pieces of DCI in a same time unit does not exceed 2, and each piece of DCI is used to schedule one codeword, if the terminal device determines that the total quantity of DMRS layers corresponding to the first DCI exceeds 4, the terminal device assumes that the second DCI does not exist; otherwise, the terminal device assumes that the second DCI exists. This is because if the total quantity of DMRS layers exceeds 4, two codewords are needed based on a layer-to-codeword mapping rule. Therefore, if two codewords are scheduled by the first DCI, it means that the second DCI cannot be used for scheduling in a same time unit.

Manner 3: The antenna port configuration information includes an antenna port supported by the terminal device. The terminal device compares the first antenna port with the antenna port supported by the terminal device. If the first antenna port is the same as the antenna port supported by the terminal device, it is assumed that the second DCI does not exist. On the contrary, if the first antenna port is not completely the same as the antenna port supported by the terminal device, or is a part of the supported antenna port, it is assumed that the second DCI exists.

For example, if the antenna port configuration information is that indexes of antenna ports are {0, 1, 2, 3, 4, 5}, and indexes of the first antenna port are {1, 3}, the terminal device assumes that the second DCI exists. If indexes of the first antenna port are {0, 1, 2, 3, 4, 5}, the terminal device assumes that the second DCI does not exist.

In this embodiment of this application, if the terminal device assumes, based on the first antenna port and the antenna port configuration information, that the second DCI exists, as shown in FIG. 6, the DCI transmission method provided in this embodiment of this application further includes the following step S604.

S604: The second network device sends the second DCI to the terminal device. The terminal device receives the second DCI from the second network device. The second DCI includes indication information 2, and the indication information 2 is used to indicate a second antenna port.

In this embodiment of this application, the indication information 2 may be indicated by an antenna port field in the second DCI, and the second antenna port indicated by the indication information 2 is an antenna port for carrying a PDSCH.

In this embodiment of this application, the terminal device may store a mapping relationship between a value (value) indicated by an antenna port field in DCI and an antenna port index. Further, the terminal device may learn, based on the mapping relationship, of the second antenna port indicated by the second DCI. For related descriptions, refer to step S602. Details are not described herein again.

In this embodiment of this application, a first TRP corresponding to the first antenna port and a second TRP corresponding to the second antenna port may be the same or different. This is not specifically limited in this embodiment of this application.

In this embodiment of this application, that the terminal device receives the second DCI may include: The terminal device stops current search on a candidate corresponding to at least one physical downlink control channel configuration (for example, PDCCH configuration), control resource set (for example, COREST), control resource set group (for example, COREST group), search space set (for example, SS set), or search space set group (for example, SS set group) associated with a first physical downlink control channel (for example, a PDCCH); and the terminal device receives the second DCI on a candidate corresponding to at least one physical downlink control channel configuration (for example, PDCCH configuration), control resource set (for example, COREST), control resource set group (for example, COREST group), search space set (for example, SS set), or search space set group (for example, SS set group) associated with a second physical downlink control channel (for example, a PDCCH).

Certainly, in this embodiment of this application, if the terminal device assumes, based on the index of the first antenna port and the antenna port configuration information, that the second DCI does not exist, the terminal device may stop blind detection of DCI. This is not specifically limited in this embodiment of this application.

Optionally, in this embodiment of this application, after receiving DCI, the terminal device may perform PDSCH receiving, demodulation, feedback, or the like based on information scheduled by the DCI. A subsequent procedure is irrelevant to the solutions in the embodiments of this application. Details are not described herein.

Optionally, the first network device and the second network device in this embodiment of this application may be a same network device. For example, the first network device and the second network device may be a same base station or a same RRU. Alternatively, the first network device and the second network device in this embodiment of this application may be different network devices. For example, the first network device and the second network device may be different base stations, different RRUs, or different TRPs. This is not specifically limited in this embodiment of this application.

Based on the DCI transmission method provided in this embodiment of this application, after receiving the first DCI indicating the first antenna port, the terminal device may assume, based on the first antenna port and the antenna port configuration information, whether the second DCI exists. If it is assumed that the second DCI exists, blind detection of the second DCI may be continued. Alternatively, if it is assumed that the second DCI does not exist, blind detection of the second DCI may be stopped, thereby saving system resources.

The processor 301 in the communications apparatus 300 shown in FIG. 3 may invoke application program code stored in the memory 303, to instruct the first network device to perform the actions of the first network device in steps S601 to S604. The processor 301 in the communications apparatus 300 shown in FIG. 3 may invoke application program code stored in the memory 303, to instruct the terminal device to perform the actions of the terminal device in steps S601 to S604. This is not limited in this embodiment.

Optionally, the DCI transmission method provided in the embodiment shown in FIG. 6 may be further extended to a case of three pieces of DCI. For example, when the terminal device may receive three pieces of DCI to schedule three PDSCHs, the three PDSCHs may completely, partially, or not overlap in time domain/frequency domain.

When the DMRS type 1 is configured for the terminal device, the terminal device receives two pieces of DCI, and may assume that other DCI does not exist. Alternatively, when the DMRS type 2 is configured for the terminal device, the terminal device receives two pieces of DCI, and if a total quantity of CDM groups occupied by the two pieces of DCI is 3, that is, a quantity of CDM groups occupied by an antenna port indicated by at least one of the two pieces of DCI is greater than 1, the terminal device considers that other DCI does not exist. On the contrary, if the quantity of CDM groups occupied by the two pieces of received DCI is 2, the terminal device may assume that other DCI exists. This is not specifically limited in this embodiment of this application.

On the other hand, in the conventional technology, a plurality of TRPs simultaneously send a plurality of data flows to a terminal device. The plurality of data flows are carried on a plurality of antenna ports for transmission. Orthogonality is ensured between different antenna ports through time division, frequency division, code division, or in another form, to ensure accuracy of performing channel estimation on the antenna ports by the terminal device by using reference signals that are sent through the antenna ports. When a plurality of antenna ports (for example, two antenna ports) are code divided, reference signals (for example, DMRSs) sent through the two antenna ports overlap in time domain. However, for the reference signals, different propagation delays, relative movement directions of the terminal device and the TRPs, or speeds cause different delays or frequency offset phenomena when the reference signals arrive at the terminal device. Consequently, the reference signals sent through the two antenna ports cause interference, leading to damage to orthogonality existing when the reference signals are distinguished by using orthogonal codes, and reduction of demodulation performance. Based on this, it is stipulated in the conventional technology that antenna ports corresponding to reference signals corresponding to data flows transmitted by different TRPs should belong to different CDM groups. In other words, a plurality of antenna ports in one CDM group should correspond to a same TRP for transmission. However, in the conventional technology, data sent by the plurality of TRPs may be scheduled by using a plurality of pieces of DCI. However, in a coordinated multi-point transmission (coordinated multi-Point, CoMP) technology, a base station may indicate one or more antenna ports to a terminal device by using an antenna port field in DCI, and the one or more antenna ports may belong to one or more CDM groups. Consequently, a problem that antenna ports indicated by a plurality of pieces of DCI may occupy a same CDM group may occur, and reference signals sent through these antenna ports may still cause interference, leading to damage to orthogonality existing when the reference signals are distinguished by using orthogonal codes, and reduction of demodulation performance. Based on this, in this embodiment of this application, the second antenna port indicated by the second DCI and the first antenna port indicated by the first DCI may be designed to belong to different CDM groups, or belong to different antenna port groups.

The following uses a design in which the second antenna port indicated by the second DCI and the first antenna port indicated by the first DCI belong to different CDM groups as an example for description.

Figure 8:
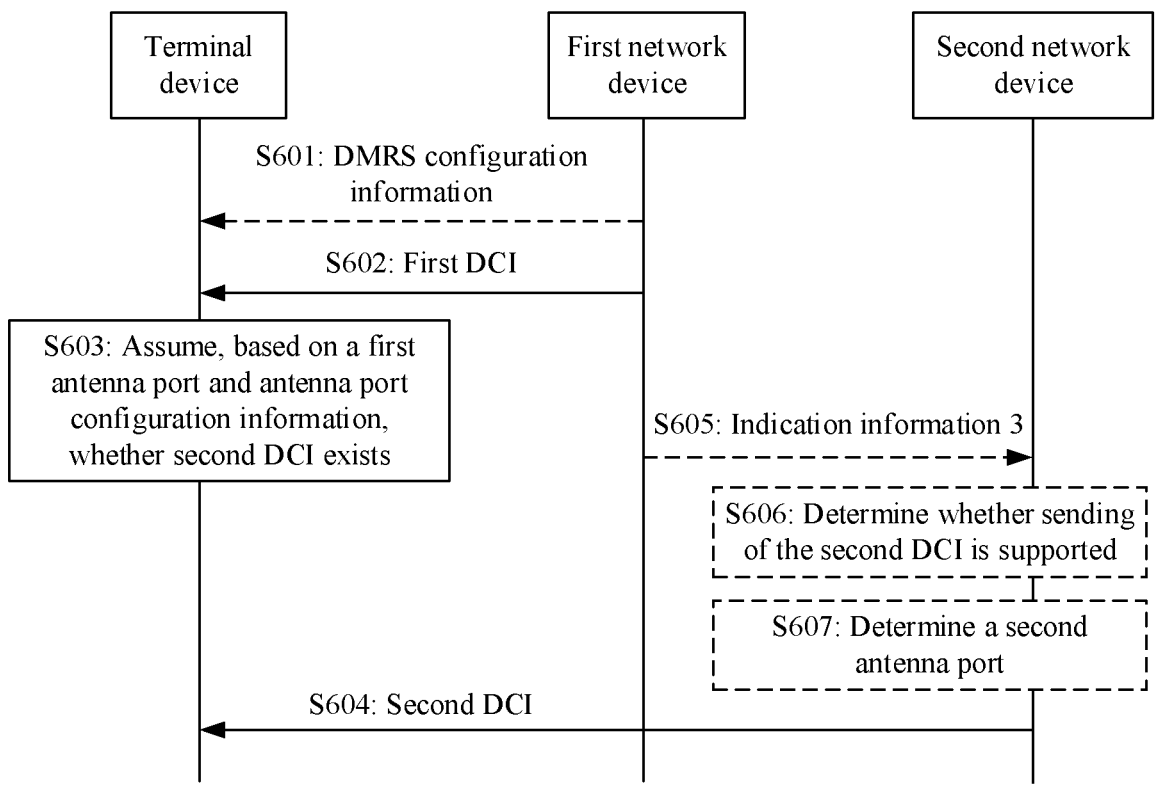
FIG. 8 is a second schematic flowchart of a DCI transmission method according to an embodiment of this application.

In a possible implementation, as shown in FIG. 8, before step S604 in the embodiment shown in FIG. 6, the DCI transmission method provided in this embodiment of this application may further include the following steps S605 to S607.

S605: The first network device sends indication information 3 to the second network device. The second network device receives the indication information 3 from the first network device.

The indication information 3 is used to indicate the CDM group to which the first antenna port belongs.

S606: The second network device determines, based on the indication information 3, whether sending of the second DCI is supported.

For a manner in which the second network device determines, based on the indication information 3, whether sending of the second DCI is supported, refer to the manner in which the terminal device assumes, based on the information about the CDM group to which the first antenna port belongs, whether the second DCI exists in the embodiment shown in FIG. 6. Details are not described herein again.

S607: If the second network device supports sending of the second DCI, the second network device determines the second antenna port based on the indication information 3, where the second antenna port is an antenna port indicated by the second DCI, and the first antenna port and the second antenna port belong to different CDM groups.

For example, assuming that the first antenna port occupies the CDM group 0, for the DMRS type 1, an antenna port in the CDM group 1 may be selected as the second antenna port. Alternatively, assuming that the first antenna port occupies the CDM group 1, for the DMRS type 1, an antenna port in the CDM group 0 may be selected as the second antenna port.

Alternatively, for example, assuming that the first antenna port occupies the CDM group 0, for the DMRS type 2, an antenna port in the CDM group 1 and/or the CDM group 2 may be selected as the second antenna port. Alternatively, assuming that the first antenna port occupies the CDM group 0 and the CDM group 1, for the DMRS type 2, an antenna port in the CDM group 2 may be selected as the second antenna port.

Based on this solution, a problem that antenna ports indicated by a plurality of pieces of DCI may occupy a same CDM group can be avoided, so that interference caused by reference signals sent through these antenna ports is avoided, damage to orthogonality existing when the reference signals are distinguished by using orthogonal codes is avoided, and demodulation performance is not reduced.

The processor 301 in the communications apparatus 300 shown in FIG. 3 may invoke application program code stored in the memory 303, to instruct first network device or the second network device to perform the actions of the first network device or the second network device in steps S601 to S607. The processor 301 in the communications apparatus 300 shown in FIG. 3 may invoke application program code stored in the memory 303, to instruct the terminal device to perform the actions of the terminal device in steps S601 to S607. This is not limited in this embodiment.

A manner in which the second antenna port indicated by the second DCI and the first antenna port indicated by the first DCI are designed to belong to different antenna port groups is similar to a manner in an embodiment shown in FIG. 8 in which the second antenna port indicated by the second DCI and the first antenna port indicated by the first DCI are designed to belong to different CDM groups, and only the foregoing CDM group needs to be replaced with an antenna port group. Details are not described herein again.

Optionally, in the embodiment shown in FIG. 8, an example in which the first network device and the second network device are different network devices is used for description. If the first network device and the second network device are a same network device, the network device may determine the first antenna port and the second antenna port, so that the first antenna port and the second antenna port belong to different CDM groups. For example, assuming that the network device is a base station, through negotiation between different BBUs of the base station, negotiation between a plurality of RRUs corresponding to one BBU, negotiation between a plurality of TRPs of the base station, or negotiation between different antenna planes of one TPR, the first antenna port and the second antenna port may belong to different CDM groups or belong to different antenna port groups. This is not specifically limited in this embodiment of this application.

In the foregoing embodiment, an example in which the first DCI or the second DCI is in a DCI format 1_1 is used for description. Optionally, in this embodiment of this application, DCI in a DCI format 1_0 may also be used for data scheduling. The DCI in the format DCI 1_0 may also be used to schedule a PDSCH, but the DCI may not have an antenna port field. Therefore, an antenna port for carrying the PDSCH is a predefined antenna port. In the protocol design of 3GPP TS 38.214 version f40, a number of a DMRS antenna port is predefined as 1000 herein. Therefore, in the case of a plurality of TRPs, if DCI for scheduling PDSCHs by two TRPs is in the DCI format 1_0, antenna ports for transmitting the PDSCHs by the two TRPs are the same. In this way, the terminal device considers that time-frequency resource positions, sequences, and the like of DMRSs of the two TRPs are the same. Consequently, the terminal device cannot distinguish between the DMRSs sent by the two TRPs, and cannot demodulate different data separately sent by the two TRPs. Based on this, this embodiment of this application provides the following two technical solutions.

Solution 1: From a perspective of a system design, it is stipulated that if the terminal device may simultaneously receive two PDCCHs and schedule two PDSCHs, formats of DCI carried by the two PDCCHs are not the DCI format 1_0.

Further, during solution implementation, the network device needs to coordinate, based on the stipulation in the system design, DCI allocation for transmission of a plurality of TRPs. For example, when the network device determines that a plurality of TRPs serve one terminal device, and data from the plurality of TRPs is scheduled by using a plurality of pieces of DCI, the network device should ensure that DCI for scheduling a PDSCH does not include DCI whose format is the DCI format 1_0.

On a terminal device side, the terminal device sets formats of the two pieces of DCI that are not expected to be received to the DCI format 1_0. In other words, if the formats of the two pieces of DCI received by the terminal device are both the DCI format 1_0, the terminal device may discard the two pieces of received DCI, or discard at least one of the two pieces of DCI. Correspondingly, the PDSCH scheduled by the DCI is also discarded by the terminal device. A further possible operation of the terminal device is that if the terminal device may receive two pieces of DCI, when the terminal device receives and detects one piece of DCI in the DCI format 1_0, the terminal device may assume that other DCI does not exist. In other words, in this embodiment of this application, the terminal device may determine, based on a format of the received DCI, whether blind detection of DCI needs to be continued.

Solution 2: From a perspective of system design, the terminal device is allowed to receive DCI whose formats are both the DCI format 1_0. In this case, another default antenna port needs to be designed for the DCI in the DCI format 1_0. In other words, the DCI in the DCI format 1_0 may have a plurality of default antenna ports, and the terminal device determines, based on other information, an antenna port corresponding to a PDSCH scheduled by the DCI in the DCI format 1_0.

Figure 9:
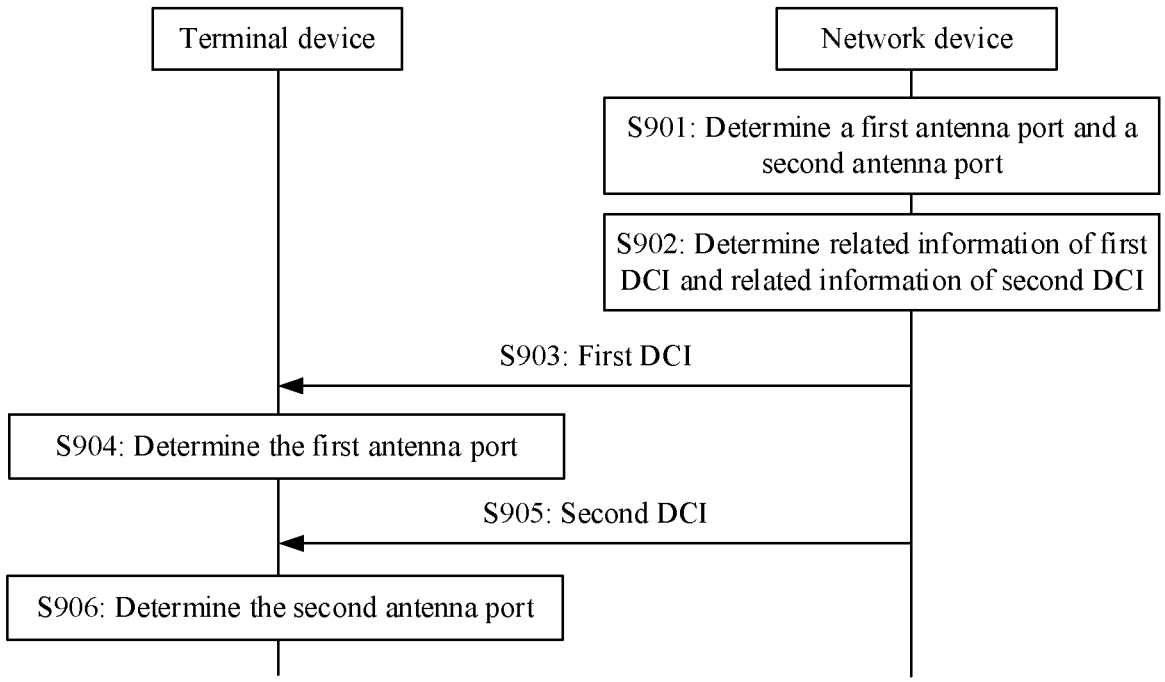
FIG. 9 is a third schematic flowchart of a DCI transmission method according to an embodiment of this application.

For example, FIG. 9 shows a DCI transmission method according to an embodiment of this application. The DCI transmission method includes the following steps.

S901: A network device determines a first antenna port and a second antenna port.

The first antenna port is an antenna port corresponding to data scheduled by first DCI, a second antenna port is an antenna port corresponding to data scheduled by second DCI, and the first antenna port and the second antenna port belong to different CDM groups.

S902: The network device determines, based on a preset rule, related information of the first DCI corresponding to the first antenna port and related information of the second DCI corresponding to the second antenna port.

S903: The network device sends the first DCI to a terminal device based on the related information of the first DCI. The terminal device receives the first DCI from the network device.

S904: The terminal device determines, based on the related information of the first DCI and the preset rule, the first antenna port corresponding to the data scheduled by the first DCI.

S905: The network device sends the second DCI to the terminal device based on the related information of the second DCI. The terminal device receives the second DCI from the network device.

S906: The terminal device determines, based on the related information of the second DCI and the preset rule, the second antenna port corresponding to the data scheduled by the second DCI.

In the foregoing steps S901 to S906:

In this embodiment of this application, the preset rule may include a mapping relationship between an antenna port and a cyclic redundancy check (cyclic redundancy check, CRC) mask (mask) of DCI; and correspondingly, the related information of the first DCI includes a CRC mask of the first DCI, and the related information of the second DCI includes a CRC mask of the second DCI.

Alternatively, in this embodiment of this application, the preset rule may include a mapping relationship between an antenna port and a COREST in which DCI is located; and correspondingly, the related information of the first DCI includes a COREST in which the first DCI is located, and the related information of the second DCI includes a COREST in which the second DCI is located.

Alternatively, in this embodiment of this application, the preset rule may include a mapping relationship between an antenna port and an SS set in which DCI is located; and correspondingly, the related information of the first DCI includes an SS set in which the first DCI is located, and the related information of the second DCI includes an SS set in which the second DCI is located.

In this embodiment of this application, the terminal device may further determine, based on higher layer configuration information, an antenna port corresponding to data scheduled by received DCI. This is not specifically limited in this embodiment of this application.

In this embodiment of this application, after receiving DCI, the terminal device may perform PDSCH receiving, demodulation, feedback, or the like based on information scheduled by the DCI. A subsequent procedure is irrelevant to the solutions in the embodiments of this application. Details are not described herein.

In this embodiment of this application, assuming that the network device is a base station, through negotiation between different BBUs of the base station, negotiation between a plurality of RRUs corresponding to one BBU, negotiation between a plurality of TRPs of the base station, or negotiation between different antenna planes of one TPR, the first antenna port and the second antenna port may belong to different CDM groups. This is not specifically limited in this embodiment of this application.

Based on the DCI transmission method provided in this embodiment of this application, when DCI in a DCI format 1_0 is used for scheduling, a problem of how to ensure that antenna ports corresponding to data scheduled by a plurality of pieces of DCI belong to different CDM groups can be resolved, thereby improving network performance.

The processor 301 in the communications apparatus 300 shown in FIG. 3 may invoke application program code stored in the memory 303, to instruct the network device to perform the actions of the network device in steps S901 to S906. The processor 301 in the communications apparatus 300 shown in FIG. 3 may invoke application program code stored in the memory 303, to instruct the terminal device to perform the actions of the terminal device in steps S901 to S906. This is not limited in this embodiment.

Figure 10:
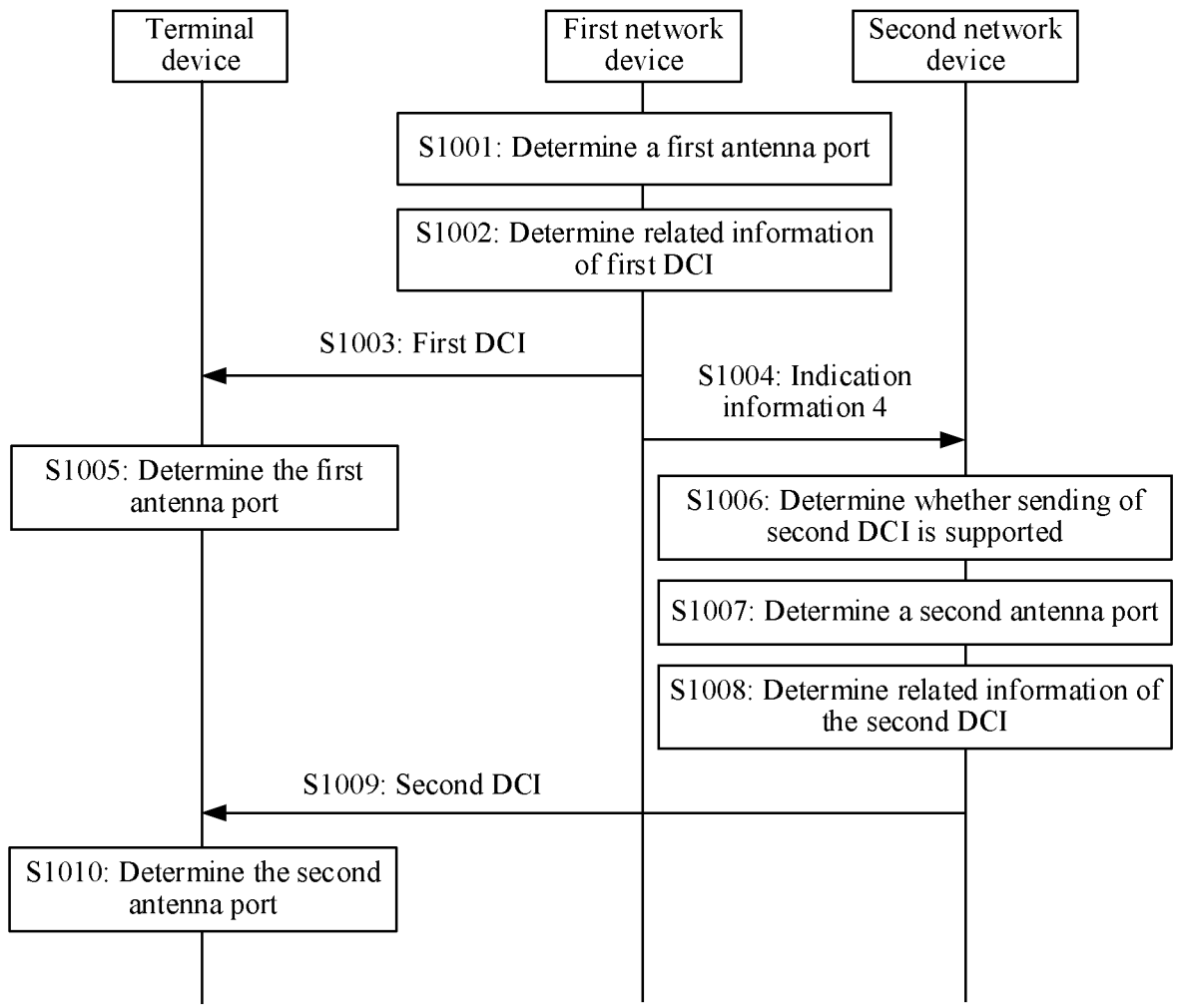
FIG. 10 is a fourth schematic flowchart of a DCI transmission method according to an embodiment of this application.

In the embodiment shown in FIG. 9, an example in which a network device sending the first DCI and a network device sending the second DCI are a same network device is used for description. In this embodiment of this application, a network device sending the first DCI and a network device sending the second DCI may alternatively be different network devices. In this scenario, for example, FIG. 10 shows a DCI transmission method according to an embodiment of this application. The DCI transmission method includes the following steps.

S1001: A first network device determines a first antenna port.

The first antenna port is an antenna port corresponding to data scheduled by first DCI.

S1002: The first network device determines, based on a preset rule, related information of the first DCI corresponding to the first antenna port.

S1003: The first network device sends the first DCI to a terminal device based on the related information of the first DCI. The terminal device receives the first DCI from the first network device.

S1004: The first network device sends indication information 4 to a second network device, and the second network device receives the indication information 4 from the first network device.

The indication information 4 is used to indicate a CDM group to which the first antenna port belongs.

Optionally, there is no necessary execution sequence between step S1003 and step S1004 in this embodiment of this application. Step S1003 may be performed before or after step S1004. Alternatively, step S1003 and step S1004 may be simultaneously performed. This is not specifically limited herein.

S1005: The terminal device determines, based on the related information of the first DCI and the preset rule, the first antenna port corresponding to the data scheduled by the first DCI.

S1006: The second network device determines, based on the indication information 4, whether sending of second DCI is supported.

S1007: If the second network device supports sending of second DCI, the second network device determines a second antenna port based on the indication information 4.

The second antenna port is an antenna port corresponding to data scheduled by the second DCI, and the first antenna port and the second antenna port belong to different CDM groups.

S1008: The second network device determines, based on the preset rule, related information of the second DCI corresponding to the second antenna port.

S1009: The second network device sends the second DCI to the terminal device based on the related information of the second DCI. The terminal device receives the second DCI from the second network device.

S1010: The terminal device determines, based on the related information of the second DCI and the preset rule, the second antenna port corresponding to the data scheduled by the second DCI.

In the foregoing steps S1001 to S1010:

For related descriptions of the preset rule, the related information of the first DCI, and the related information of the second DCI, refer to the embodiment shown in FIG. 9. Details are not described herein again.

For related descriptions of determining, by the second network device based on the indication information 4, whether sending of the second DCI is supported, refer to step S606 in the embodiment shown in FIG. 6. Details are not described herein again.

Optionally, in this embodiment of this application, the terminal device may further determine, based on higher layer configuration information, an antenna port corresponding to data scheduled by received DCI. This is not specifically limited in this embodiment of this application.

Optionally, in this embodiment of this application, after receiving DCI, the terminal device may perform PDSCH receiving, demodulation, feedback, or the like based on information scheduled by the DCI. A subsequent procedure is irrelevant to the solutions in the embodiments of this application. Details are not described herein.

Optionally, in this embodiment of this application, for related descriptions of the first network device and the second network device, refer to the embodiment shown in FIG. 6. Details are not described herein again.

Based on the DCI transmission method provided in this embodiment of this application, when DCI in a DCI format 1_0 is used for scheduling, a problem of how to ensure that antenna ports corresponding to data scheduled by a plurality of pieces of DCI belong to different CDM groups can be resolved, thereby improving network performance.

The processor 301 in the communications apparatus 300 shown in FIG. 3 may invoke application program code stored in the memory 303, to instruct first network device or the second network device to perform the actions of the first network device or the second network device in steps S1001 to S1010. The processor 301 in the communications apparatus 300 shown in FIG. 3 may invoke application program code stored in the memory 303, to instruct the terminal device to perform the actions of the terminal device in steps S1001 to S1010. This is not limited in this embodiment.

Both the embodiments shown in FIG. 9 and FIG. 10 are described by using an example in which the second antenna port indicated by the second DCI and the first antenna port indicated by the first DCI are designed to belong to different CDM groups. A manner in which the second antenna port indicated by the second DCI and the first antenna port indicated by the first DCI are designed to belong to different antenna port groups is similar to a manner in the embodiment shown in FIG. 9 or FIG. 10 in which the second antenna port indicated by the second DCI and the first antenna port indicated by the first DCI are designed to belong to different CDM groups, and only the foregoing CDM group needs to be replaced with an antenna port group. Details are not described herein again.

It should be noted that DCI involved in the embodiments of this application may be UE-specific DCI and does not include cell-common DCI. That is, optionally, a CRC code of DCI in the embodiments of this application may be at least one of a cell radio network temporary identifier (C-RNTI), a modulation and coding scheme (modulation and coding scheme, MCS)-C-RNTI, a configured grant (CS)-RNTI, or a new RNTI that can be used for a particular service type. Further, in the embodiments of this application, a search space in which DCI is located is a terminal device-specific search space, that is, a search space whose number is not 0. In the embodiments of this application, a CORESET in which DCI is located is a terminal device-specific CORESET, that is, a CORESET whose number is not 0. A general description is provided herein, and details are not described below again.

It may be understood that, in the foregoing embodiments, methods and/or steps implemented by the network device (including the first network device, the second network device, or the network device) may also be implemented by a component (for example, a chip or a circuit) that can be used in the network device, and methods and/or steps implemented by the terminal device may also be implemented by a component (for example, a chip or a circuit) that can be used in the terminal device.

The foregoing mainly describes the solutions provided in the embodiments of this application from a perspective of interaction between the network elements. Correspondingly, an embodiment of this application further provides a communications apparatus. The communications apparatus is configured to implement the foregoing methods. The communications apparatus may be the terminal device in the foregoing method embodiments, an apparatus including the foregoing terminal device, or a component that can be used in the terminal device. Alternatively, the communications apparatus may be the network device (including the first network device, the second network device, or the network device) in the foregoing method embodiments, or an apparatus including the foregoing network device, or a component that can be used in the network device. It may be understood that, to implement the foregoing functions, the communications apparatus includes a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communications apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that the module division in the embodiments of this application is an example, and is merely logical function division. There may be another division manner during actual implementation.

Figure 11:
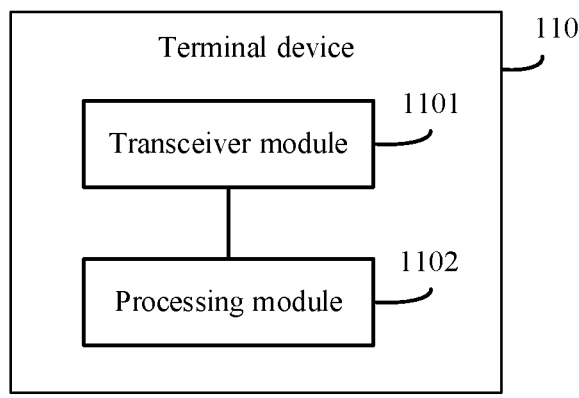
FIG. 11 is a second schematic structural diagram of a terminal device according to an embodiment of this application.

For example, the communications apparatus is the terminal device in the foregoing method embodiments. FIG. 11 is a schematic structural diagram of a terminal device 110. The terminal device 110 includes a transceiver module 1101 and a processing module 1102. The transceiver module 1101 may also be referred to as a transceiver unit, and is configured to implement a transceiver function. For example, the transceiver module 1101 may be a transceiver circuit, a transceiver, a transceiver, or a communications interface.

The transceiver module 1101 is configured to receive first DCI, where the first DCI includes first indication information, and the first indication information is used to indicate a first antenna port. The processing module 1102 is configured to assume, based on the first antenna port and antenna port configuration information, whether second DCI exists.

Optionally, a second antenna port indicated by the second DCI and the first antenna port belong to different code division multiplexing CDM groups or belong to different antenna port groups.

In a possible implementation, the antenna port configuration information includes an index of a CDM group to which each of a plurality of antenna ports belongs and a maximum quantity of CDM groups that is supported by the terminal device 110.

That the processing module 1102 is configured to assume, based on the first antenna port and the antenna port configuration information, whether the second DCI exists includes: The processing module 1102 is configured to: determine, based on an index of the first antenna port and the index of the CDM group to which each antenna port belongs, information about a CDM group to which the first antenna port belongs; and assume, based on the information about the CDM group to which the first antenna port belongs and the maximum quantity of CDM groups, whether the second DCI exists.

The information about the CDM group to which the first antenna port belongs includes a quantity of CDM groups to which the first antenna port belongs.

That the processing module 1102 is configured to assume, based on the information about the CDM group and the maximum quantity of CDM groups, whether the second DCI exists includes: if the quantity of CDM groups is less than the maximum quantity of CDM groups, assume that the second DCI exists; or if the quantity of CDM groups is equal to the maximum quantity of CDM groups, assume that the second DCI does not exist Alternatively, the information about the CDM group to which the first antenna port belongs includes an index of the CDM group to which the first antenna port belongs.

That the processing module 1102 is configured to assume, based on the information about the CDM group and the maximum quantity of CDM groups, whether the second DCI exists includes: if the index of the CDM group to which the first antenna port belongs is the same as an index of a CDM group corresponding to the maximum quantity of CDM groups, assume that the second DCI does not exist; or if the index of the CDM group to which the first antenna port belongs is not completely the same as an index of a CDM group corresponding to the maximum quantity of CDM groups, assume that the second DCI exists.

Alternatively, that the processing module 1102 is configured to assume, based on the information about the CDM group and the maximum quantity of CDM groups, whether the second DCI exists includes: if the index of the CDM group to which the first antenna port belongs is the same as an index of a CDM group corresponding to the maximum quantity of CDM groups, assume that the second DCI does not exist; or if the index of the CDM group to which the first antenna port belongs is not completely the same as an index of a CDM group corresponding to the maximum quantity of CDM groups, and the index of the CDM group to which the first antenna port belongs satisfies a specified rule, assume that the second DCI exists; or if the index of the CDM group to which the first antenna port belongs is not completely the same as an index of a CDM group corresponding to the maximum quantity of CDM groups, and the index of the CDM group to which the first antenna port belongs does not satisfy the specified rule, assume that the second DCI exists.

The antenna port configuration information includes one or more antenna port groups, and each antenna port group includes one or more antenna ports.

That the processing module 1102 is configured to assume, based on the first antenna port and the antenna port configuration information, whether the second DCI exists includes: if the index of the first antenna port belongs to a part of the antenna port groups, assuming that the second DCI exists; or if the index of the first antenna port belongs to all of the antenna port groups, assuming that the second DCI does not exist.

Alternatively, that the processing module 1102 is configured to assume, based on the first antenna port and the antenna port configuration information, whether the second DCI exists includes: if the index of the first antenna port belongs to a part of the antenna port groups, and the index of the first antenna port satisfies a specified rule, assuming that the second DCI exists; or if the index of the first antenna port belongs to a part of the antenna port groups, and the index of the first antenna port does not satisfy a specified rule, assuming that the second DCI does not exist; or if the index of the first antenna port belongs to all of the antenna port groups, assuming that the second DCI does not exist.

A first transmission reception point TRP corresponding to the first antenna port is different from a second TRP corresponding to the second antenna port.

If it is assumed that the second DCI exists, the transceiver module 1101 is further configured to receive the second DCI.

That the transceiver module 1101 is configured to receive the second DCI includes: The transceiver module 1101 is configured to: stop current search on a candidate corresponding to at least one physical downlink control channel configuration, control resource set, control resource set group, search space set, or search space set group associated with a first physical downlink control channel; and receive the second DCI on a candidate corresponding to at least one physical downlink control channel configuration, control resource set, search space set, or search space set group associated with a second physical downlink control channel.

All related content of the steps in the foregoing method embodiments may be cited in function descriptions of the corresponding functional modules. Details are not described herein again.

In this embodiment, the terminal device 110 is presented in a form of functional modules obtained through division in an integrated manner. The "module" herein may be a specific ASIC, a circuit, a processor that executes one or more software or firmware programs and a memory, an integrated logic circuit, and/or another component that can provide the foregoing functions. In a simple embodiment, a person skilled in the art may figure out that the terminal device 110 may be in the form of the communications apparatus 300 shown in FIG. 3.

For example, the processor 301 in the communications apparatus 300 shown in FIG. 3 may invoke the computer-executable instructions stored in the memory 303, to enable the communications apparatus 300 to perform the DCI transmission method in the foregoing method embodiments.

Specifically, functions/implementation processes of the transceiver module 1101 and the processing module 1102 in FIG. 11 may be implemented by the processor 301 in the communications apparatus 300 shown in FIG. 3 by invoking the computer-executable instructions stored in the memory 303. Alternatively, a function/an implementation process of the processing module 1102 in FIG. 11 may be implemented by the processor 301 in the communications apparatus 300 shown in FIG. 3 by invoking the computer-executable instructions stored in the memory 303, and a function/an implementation process of the transceiver module 1101 in FIG. 11 may be implemented through the communications interface 304 in the communications apparatus 300 shown in FIG. 3.

Because the terminal device 110 provided in this embodiment may perform the foregoing DCI transmission method, for a technical effect that can be achieved by the terminal device 110, refer to the foregoing method embodiments. Details are not described herein again.

Figure 12:
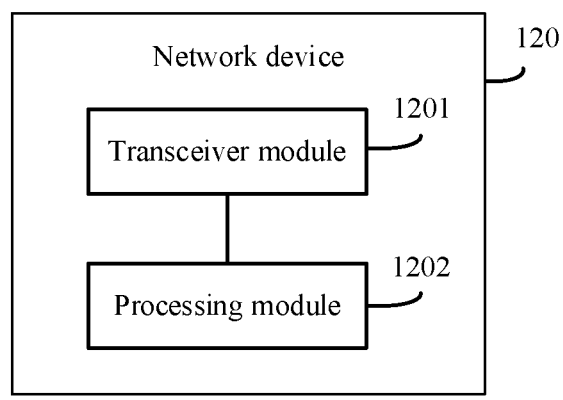
FIG. 12 is a schematic structural diagram of a network device according to an embodiment of this application.

Alternatively, for example, an example in which the communications apparatus is the network device in the foregoing method embodiments is used. FIG. 12 is a schematic structural diagram of a network device 120. The network device 120 includes a transceiver module 1201 and a processing module 1202. The transceiver module 1201 may also be referred to as a transceiver unit, and is configured to implement a transceiver function. For example, the transceiver module 1201 may be a transceiver circuit, a transceiver, a transceiver, or a communications interface.

The processing module 1202 is configured to determine a first antenna port and a second antenna port, where the first antenna port is an antenna port indicated by a first downlink control information DCI, the second antenna port is an antenna port indicated by second DCI, and the first antenna port and the second antenna port belong to different CDM groups or belong to different antenna port groups. The transceiver module 1201 is configured to send the first DCI to a terminal device, where the first DCI includes indication information, and the indication information is used to indicate the first antenna port.

All related content of the steps in the foregoing method embodiments may be cited in function descriptions of the corresponding functional modules. Details are not described herein again.

In this embodiment, the network device 120 is presented in a form of functional modules obtained through division in an integrated manner. The "module" herein may be a specific ASIC, a circuit, a processor that executes one or more software or firmware programs and a memory, an integrated logic circuit, and/or another component that can provide the foregoing functions. In a simple embodiment, a person skilled in the art may figure out that the network device 120 may be in the form of the communications apparatus 300 shown in FIG. 3.

For example, the processor 301 in the communications apparatus 300 shown in FIG. 3 may invoke the computer-executable instructions stored in the memory 303, to enable the communications apparatus 300 to perform the DCI transmission method in the foregoing method embodiments.

Specifically, functions/implementation processes of the transceiver module 1201 and the processing module 1202 in FIG. 12 may be implemented by the processor 301 in the communications apparatus 300 shown in FIG. 3 by invoking the computer-executable instructions stored in the memory 303. Alternatively, a function/an implementation process of the processing module 1202 in FIG. 12 may be implemented by the processor 301 in the communications apparatus 300 shown in FIG. 3 by invoking the computer-executable instructions stored in the memory 303, and a function/an implementation process of the transceiver module 1201 in FIG. 12 may be implemented through the communications interface 304 in the communications apparatus 300 shown in FIG. 3.

Because the network device 120 provided in this embodiment may perform the foregoing DCI transmission method, for a technical effect that can be achieved by the network device 120, refer to the foregoing method embodiments. Details are not described herein again.

Figure 13:
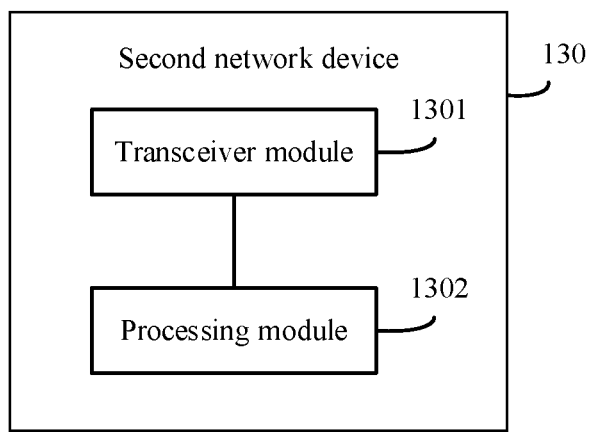
FIG. 13 is a schematic structural diagram of a second network device according to an embodiment of this application.

Alternatively, for example, an example in which the communications apparatus is the second network device in the foregoing method embodiments is used. FIG. 13 is a schematic structural diagram of a second network device 130. The second network device 130 includes a transceiver module 1301 and a processing module 1302. The transceiver module 1301 may also be referred to as a transceiver unit, and is configured to implement a transceiver function. For example, the transceiver module 1301 may be a transceiver circuit, a transceiver, a transceiver, or a communications interface.

The transceiver module 1301 is configured to receive first indication information from a first network device, where the first indication information is used to indicate a CDM group or an antenna port group to which a first antenna port belongs, and the first antenna port is an antenna port indicated by first DCI. The processing module 1302 is configured to determine, based on the first indication information, whether sending of second DCI is supported. The processing module 1302 is further configured to: if it is determined that sending of the second DCI is supported, determine a second antenna port based on the first indication information, where the second antenna port is an antenna port indicated by the second DCI, and the first antenna port and the second antenna port belong to different CDM groups or belong to different antenna port groups. The transceiver module 1301 is further configured to send the second DCI to the terminal device, where the second DCI includes second indication information, and the second indication information is used to indicate the second antenna port.

All related content of the steps in the foregoing method embodiments may be cited in function descriptions of the corresponding functional modules. Details are not described herein again.

In this embodiment, the second network device 130 is presented in a form of dividing functional modules through integration. The "module" herein may be a specific ASIC, a circuit, a processor that executes one or more software or firmware programs and a memory, an integrated logic circuit, and/or another component that can provide the foregoing functions. In a simple embodiment, a person skilled in the art may figure out that the second network device 130 may be in the form of the communications apparatus 300 shown in FIG. 3.

For example, the processor 301 in the communications apparatus 300 shown in FIG. 3 may invoke the computer-executable instructions stored in the memory 303, to enable the communications apparatus 300 to perform the DCI transmission method in the foregoing method embodiments.

Specifically, functions/implementation processes of the transceiver module 1301 and the processing module 1302 in FIG. 13 may be implemented by the processor 301 in the communications apparatus 300 shown in FIG. 3 by invoking the computer-executable instructions stored in the memory 303. Alternatively, a function/an implementation process of the processing module 1302 in FIG. 13 may be implemented by the processor 301 in the communications apparatus 300 shown in FIG. 3 by invoking the computer-executable instructions stored in the memory 303, and a function/an implementation process of the transceiver module 1301 in FIG. 13 may be implemented through the communications interface 304 in the communications apparatus 300 shown in FIG. 3.

Because the second network device 130 provided in this embodiment may perform the foregoing DCI transmission method, for a technical effect that can be achieved by the second network device 130, refer to the foregoing method embodiments. Details are not described herein again.

It should be noted that one or more of the foregoing modules or units may be implemented by using software, hardware, or a combination thereof. When any one of the foregoing modules or units is implemented by software, the software exists in a form of computer program instructions that are stored in a memory. The processor may be configured to execute the program instructions to implement the foregoing method procedures. The processor may be built in an SoC (system-on-a-chip) or an ASIC, or may be an independent semiconductor chip. In addition to a core configured to perform an operation or processing by executing the software instructions, the processor may further include a necessary hardware accelerator, for example, a field programmable gate array (field programmable gate array, FPGA), a PLD (programmable logic device), or a logic circuit that implements a dedicated logical operation.

When the foregoing modules or units are implemented by using hardware, the hardware may be any one of or any combination of a CPU, a microprocessor, a digital signal processing (digital signal processing, DSP) chip, a microcontroller unit (microcontroller unit, MCU), an artificial intelligence processor, an ASIC, an SoC, an FPGA, a PLD, a dedicated digital circuit, a hardware accelerator, or a non-integrated discrete component, and the hardware may run necessary software or does not depend on software, to perform the foregoing method procedures.

Optionally, an embodiment of this application further provides a communications apparatus (for example, the communications apparatus may be a chip or a chip system). The communications apparatus includes a processor, configured to implement the method in any one of the foregoing method embodiments. In a possible design, the communications apparatus further includes a memory. The memory is configured to store necessary program instructions and data. The processor may invoke program code stored in the memory, to instruct the communications apparatus to perform the method in any one of the foregoing method embodiments. Certainly, the memory may not be in the communications apparatus. When the communications apparatus is a chip system, the communications apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the spirit and scope of this application. In this way, this application is intended to cover these modifications and variations of this application provided that they fall within the scope of the claims of this application and equivalent technologies thereof

What is claimed is:

1. A downlink control information (DCI) transmission method, wherein the method comprises:
   receiving, by a terminal, first DCI, wherein the first DCI comprises first indication information, and the first indication information indicates a first antenna port; and
   determining, by the terminal based on the first antenna port and antenna port configuration information, whether second DCI exists;
   wherein the antenna port configuration information comprises an index of a CDM group to which the first antenna port belongs and a maximum quantity of CDM groups that is supported by the terminal; and
   wherein the determining, by the terminal based on the first antenna port and the antenna port configuration information, of whether the second DCI exists comprises:
   determining, by the terminal based on an index of the first antenna port and the index of the CDM group to which the first antenna port belongs, information about the CDM group to which the first antenna port belongs; and
   determining, by the terminal based on the information about the CDM group to which the first antenna port belongs and the maximum quantity of CDM groups that is supported by the terminal, whether the second DCI exists.

2. The method according to claim 1, wherein a second antenna port indicated by the second DCI and the first antenna port belong to different code division multiplexing (CDM) groups or belong to different antenna port groups.

3. The method according to claim 1, wherein the information about the CDM group to which the first antenna port belongs comprises a quantity of CDM groups to which the first antenna port belongs.

4. The method according to claim 3, wherein the determining, by the terminal based on the information about the CDM group and the maximum quantity of CDM groups, of whether the second DCI exists comprises:
   if the quantity of CDM groups is less than the maximum quantity of CDM groups, determining, by the terminal, that the second DCI exists; or
   if the quantity of CDM groups is equal to the maximum quantity of CDM groups, determining, by the terminal, that the second DCI does not exist.

5. The method according to claim 1, wherein the information about the CDM group to which the first antenna port belongs comprises an index of the CDM group to which the first antenna port belongs.

6. The method according to claim 5, wherein the determining, by the terminal based on the information about the CDM group and the maximum quantity of CDM groups, of whether the second DCI exists comprises:
   if the index of the CDM group to which the first antenna port belongs is the same as an index of a CDM group corresponding to the maximum quantity of CDM groups, determining, by the terminal, that the second DCI does not exist; or
   if the index of the CDM group to which the first antenna port belongs is not the same as an index of a CDM group corresponding to the maximum quantity of CDM groups, determining, by the terminal, that the second DCI exists.

7. A communications apparatus, wherein the apparatus comprises a transceiver, a memory and a processor, wherein
   the memory is configured to store computer-executable instructions, and the processor executes the computer-executable instructions stored in the memory to:
   receive by the transceiver first downlink control information (DCI) in a downlink control signal, wherein the first DCI comprises first indication information, and the first indication information indicates a first antenna port;
   wherein antenna port configuration information comprises an index of a CDM group to which the first antenna port belongs and a maximum quantity of CDM groups that is supported by a terminal device; and
   wherein the processor executes the computer-executable instructions stored in the memory to further determine, based on an index of the first antenna port and the index of the CDM group to which the first antenna port belongs, information about a CDM group to which the first antenna port belongs; and determine, based on the information about the CDM group to which the first antenna port belongs and the maximum quantity of CDM groups that is supported by the terminal device, whether a second DCI exists.

8. The apparatus according to claim 7, wherein a second antenna port indicated by the second DCI and the first antenna port belong to different code division multiplexing (CDM) groups or belong to different antenna port groups.

9. The apparatus according to claim 7, wherein the information about the CDM group to which the first antenna port belongs comprises a quantity of CDM groups to which the first antenna port belongs.

10. The apparatus according to claim 9, wherein the processor executes the computer-executable instructions stored in the memory, to:
    if the quantity of CDM groups is less than the maximum quantity of CDM groups, determine that the second DCI exists; or
    if the quantity of CDM groups is equal to the maximum quantity of CDM groups, determine that the second DCI does not exist.

11. The apparatus according to claim 7, wherein the information about the CDM group to which the first antenna port belongs comprises the index of the CDM group to which the first antenna port belongs.

12. The apparatus according to claim 11, wherein when the processor executes the computer-executable instructions stored in the memory, the apparatus is further configured to:
if the index of the CDM group to which the first antenna port belongs is not the same as an index of a CDM group corresponding to the maximum quantity of CDM groups, determine that the second DCI does not exist; or
if the index of the CDM group to which the first antenna port belongs is not the same as an index of a CDM group corresponding to the maximum quantity of CDM groups, determine that the second DCI exists.

13. The apparatus according to claim 7, wherein the configuration information comprises one or more antenna port groups, and each antenna port group comprises one or more antenna ports.

* * * * *

UNITED STATES PATENT AND TRADEMARK OFFICE
CERTIFICATE OF CORRECTION

PATENT NO. : 11,979,225 B2
APPLICATION NO. : 17/487397
DATED : May 7, 2024
INVENTOR(S) : Liuliu Ji et al.

It is certified that error appears in the above-identified patent and that said Letters Patent is hereby corrected as shown below:

In the Claims

In Column 44, Line 37, in Claim 7, delete "wherein" and insert -- wherein the --.
In Column 44, Line 50, in Claim 7, delete "a" and insert -- the --.
In Column 45, Line 9, in Claim 12, delete "is not" and insert -- is --.

Signed and Sealed this
Second Day of July, 2024

Katherine Kelly Vidal
*Director of the United States Patent and Trademark Office*